July 25, 1961     M. D. McFARLANE     2,993,997
REFUELING CONTACT AID

Filed June 28, 1957            8 Sheets-Sheet 1

INVENTOR.
Maynard D. McFarlane
BY
HIS ATTORNEY

July 25, 1961  M. D. McFARLANE  2,993,997
REFUELING CONTACT AID

Filed June 28, 1957  8 Sheets-Sheet 2

INVENTOR.
Maynard D. McFarlane.
BY
HIS ATTORNEY

July 25, 1961

M. D. McFARLANE 2,993,997

REFUELING CONTACT AID

Filed June 28, 1957

INVENTOR.
Maynard D. McFarlane.
BY
Albert J. Henderson
HIS ATTORNEY

INVENTOR.
Maynard D. McFarlane.
BY
HIS ATTORNEY

INVENTOR.
Maynard D. McFarlane.
BY
Albert J. Henderson
HIS ATTORNEY

United States Patent Office 2,993,997
Patented July 25, 1961

2,993,997
REFUELING CONTACT AID
Maynard D. McFarlane, Corona del Mar, Calif., assignor to Robertshaw-Fulton Controls Company, Richmond, Va., a corporation of Delaware
Filed June 28, 1957, Ser. No. 668,695
17 Claims. (Cl. 250—203)

This invention relates to instrumentation for determining the relative range and direction of an object in one location from another location, and more particularly to determination of range and direction of a fixed or movable object or vehicle from another vehicle.

While not limited to this application, the invention is described in relation to airborne electronic instrumentation, and more particularly to combinations of circuitry and components for providing a visual indication within an aircraft of the relative range and position of refueling apparatus towed by a tanker aircraft.

Modern in-flight refueling systems operate with a probe and drogue contact between a tanker aircraft and the aircraft to be refueled. This requires that the following aircraft approach the tanker in such a direction and at such a speed that satisfactory contact is established.

Under adverse viewing conditions, such as night operations or operations at extreme altitudes, when the location of the probe, the drogue, and the tanker aircraft are not simultaneously visible to the pilot of the follower aircraft, it is extremely difficult for the pilot to establish the precise location of contact. In addition, the physical location of the refueling probe on the wing tip of a receiver aircraft may render it almost impossible for the pilot of a swept wing aircraft or the like to judge his position accurately enough to establish contact. A similar situation exists when the probe is located beneath the fuselage of the aircraft, behind the pilot on top of the fuselage, or in any position where it is not always clearly visible to the pilot. If the pilot is forced to look away from the tanker aircraft in establishing contact, the risk of collision is greatly increased.

It will be evident that the problem of establishing in-flight refueling contact between high speed aircraft requires that the pilot of the follower aircraft receive reliable guidance in maneuvering into the required position with relation to the tanker aircraft. This guidance is often furnished by radio communication from the tanker crew to the pilot of the follower craft. However, for operational use at night, in bad weather, or in times of radio silence this system is not suitable.

Purely optical methods employing lenses and mirrors have been suggested for locating a drogue unit in reference to a probe, but problems such as excessive vibration which are encountered in transferring an optical image from the probe to the cockpit render such systems entirely unsuitable for actual use.

The present invention overcomes the difficulties above outlined by providing the pilot with a visual indication within the cockpit of the position of a drogue unit towed by the tanker aircraft. In order to comply with combat zone requirements for radio and radar silence, the preferred embodiment of the invention employs infrared radiation. However, the system may be employed equally well with visible light, radar waves, or any other suitable wavelength in the electromagnetic spectrum. The visual indication within the aircraft may be provided by means of a cathode ray oscilloscope cockpit indicator. Or, if desired, a cross-pointer indicator of the type used in Instrument Landing System presentations may be used to portray the indication. The representation of the drogue position may be made linear with respect to the position of the probe and drogue, or may be modified to accentuate the accuracy in respect to the immediate contact area.

The invention eliminates the difficulties which surround purely optical systems by sensing radiant energy, converting it to electrical signals by photoelectric or other suitable means, and controlling certain novel electronic circuits by such signals in order to furnish a visual indication within the cockpit of the following aircraft.

Accordingly, therefore, a primary object of this invention is to visually indicate within an airborne vehicle the relative range and proximity of a component of a second airborne vehicle.

Another object of this invention is to display within the cockpit of an aircraft the rectangular coordinates as well as the range of a drogue unit trailed behind an airborne tanker aircraft.

Another object of the present invention is to expedite the problem of mobile approach and closure by providing within one moving vehicle a precise visual indication of the relative range and proximity of an approaching moving vehicle.

A further object of this invention is to signal logarithmically as related to the signal level of the incident energy received from a source of radiant energy.

A still further object of the invention is to polarize the energy in a beam of radiation into components indicative of the coordinates and range of the source which propagates the beam.

These and other objects and advantages of the present invention will become apparent by referring to the accompanying detailed description and drawings in which.

Figure 1:
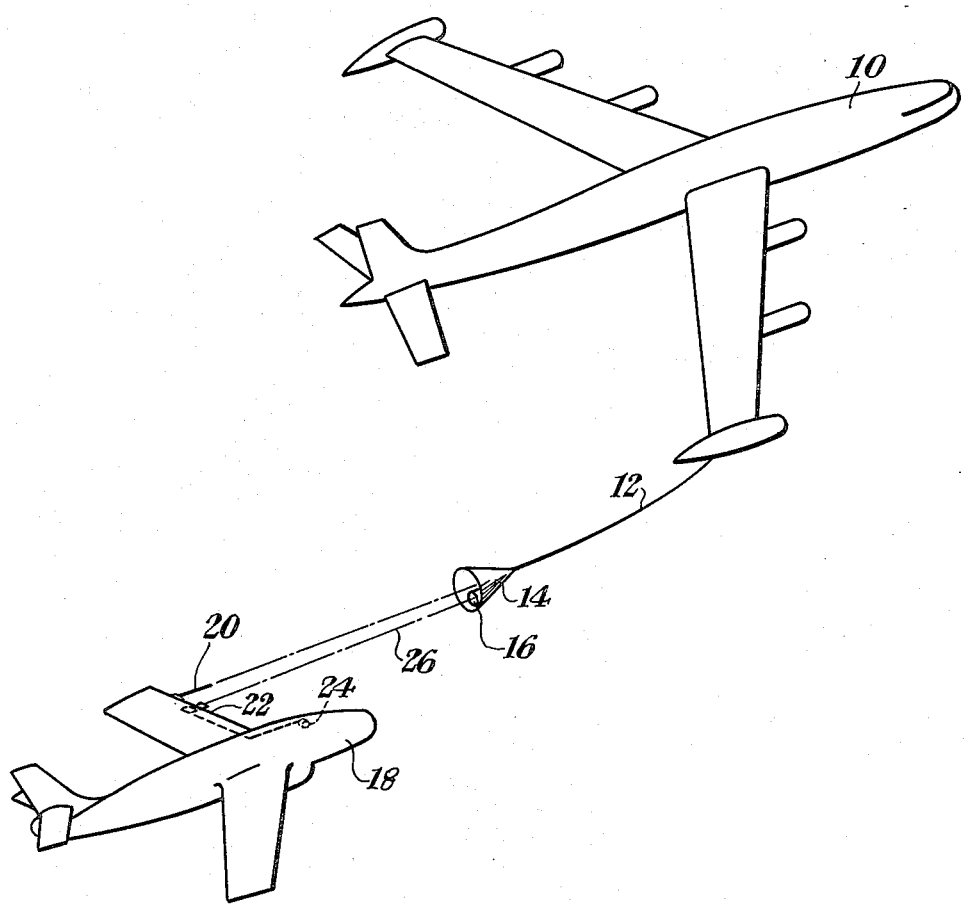
FIG. 1 is a schematic illustration of the relationship between a tanker aircraft and a follower aircraft, and indicates the parallelism required between the flight path and the radiant energy beam emitted by the drogue unit.

Turning now to the drawings, and more particularly to FIG. 1 thereof, the numeral 10 designates a tanker aircraft provided with a refueling conduit 12 affixed to the wingtip thereof. The conduit 12 terminates in a drogue unit 14 which is provided with a radiant energy source 16.

The drogue unit 14 may be stabilized by the use of airfoils and caused to follow the tanker aircraft by proper alignment of these airfoils. The source 16 within the drogue unit may provide emanations of energy 26 such as visible light, infra-red, radar waves, or any other suitable type of radiant energy lying in the electromagnetic spectrum.

It will be appreciated that the radiant energy source 16 may be mounted upon either the following aircraft or the tanker 10, if desired, rather than within the drogue unit.

The applicability of the circuits of the present invention to continuous as well as modulated bursts of radiant energy will become obvious as the detailed description of the invention proceeds.

More particularly, where it is desired to use energy in the infra-red spectrum, the source 16 may be pulsed or repetitively switched on and off at a predetermined frequency. For instance, source 16 may comprise a lamp having an incandescent filament which is switched off and on at a definite frequency. Or, such a source may be shuttered by a perforated rotating disc. If desired, an infra-red source such as a gas-filled neon lamp may be employed. Under these circumstances, the lamp itself is energized by an operating potential which varies at the preset rate. Thus, such a gas-filled lamp can be caused to propagate a modulated infra-red beam at some suitable frequency, such as 400 or 800 cycles per second. Such a modulated source of radiant energy produces an alternating signal voltage in the receiver equipment disclosed in the present invention. As a result, the signal beamed from the source may be readily distinguished from stray infra-red radiation occasioned by solar radiation, and the like.

In the lower left-hand corner of FIG. 1, there is illustrated an airplane 18 provided with a probe 20 which is adapted to register and engage with the drogue unit 14, and receive fuel via the refueling conduit 12. Slightly to the right of the drogue unit 14 there is shown a receiver unit 22 positioned to receive and respond to radiant energy emitted by the source 16 within the drogue unit, and provide signals indicative of the spatial position thereof to an indicator unit generally indicated by the reference numeral 24, and positioned within the cockpit of the airplane 18.

The receiver unit 22 may be located adjacent the probe 20, at a distance not greater than the radius of the drogue unit 14. Where such a location is deemed to produce an undesirable shadow effect on the receiver, two separate receivers may be used equally well and the field of view divided therebetween. The features of the receiver unit 22 and indicator 24 will be explained more thoroughly in connection with the portions of the detailed description of the present specification relevant thereto.

Figure 2:
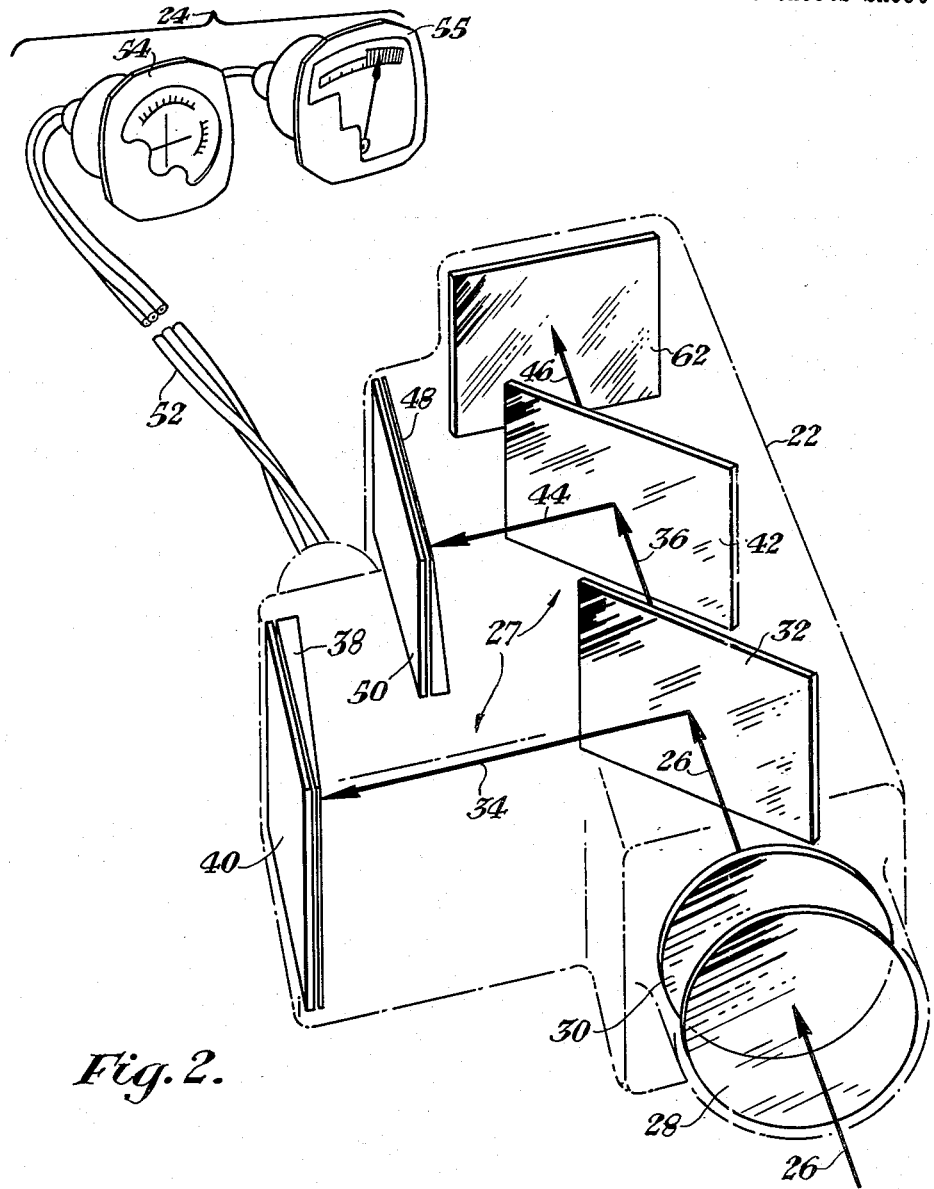
FIG. 2 is a perspective view of an arrangement of optical wedges and beam splitters used in conjunction with radiation-sensitive devices to polarize the received signal into horizontal, vertical, and range components.

Continuing now with the detailed description of the invention, and turning to the diagrammatic representation of the receiver unit 22 depicted in FIG. 2, the numeral 27 indicates generally an electro-optical system which is used for providing signals related to the relative range and angular position of the drogue unit 14 with respect to the optical axis of the receiver 22. As will be apparent more fully from the following detailed description, the receiver unit includes three distinct optical systems for separating the incoming radiant energy into separate electrical signals proportional to the range as well as the location of the drogue unit with respect to the axis of the optical system.

More particularly, the beam of energy 26 emitted by the radiant energy source 16 is received and, after being filtered by means of the filter 28, is collimated by the lens 30. The collimated beam of energy which emerges from the lens 30 is applied to a conventional beam splitter 32. The splitter 32 is characterized by the ability to reflect a predetermined quantity of the incident beam 26, and allow the remaining fraction of the beam to pass therethrough. Thus, the collimated beam 26 is divided by the beam splitter 32 into a reflected fraction 34 which comprises one-third of the incident energy and a transmitted fraction 36 which comprises the remaining two-thirds of the incoming energy.

The reflected portion 34 is applied to conventional optical wedge 38 which is associated with a radiation-sensitive element 40. The optical wedge 38 is triangular in cross-section and is thus proportioned to excite the sensitive element 40 with energy which has an intensity proportional to the distance between the reflected beam portion 34 and the vertical edge of the wedge. It should be realized in this connection that the wedge 38 may be provided with an exponential or logarithmically curved cross-section in order to enhance the sensitivity thereof, and produce a desirably sharp nonlinear response. The element 40 may comprise a photosensitive transistor, a barrier layer device, a photoelectric cell, or the like, which is characterized by the ability to produce an output voltage related to the intensity of the incident radiation. For use in the infra-red region, a photosensitive element such as a lead sulphide cell may be used with excellent results. The optical wedge 38 and the sensitive element 40, acting together, produce an electrical signal proportional to the horizontal deviation of the drogue unit from the optical axis of the receiver unit 22.

The transmitted beam fraction 36 which traverses the beam splitter 32 is applied to a second conventional beam splitter 42. The beam splitter 42 is of the same type as the earlier described beam splitter 32 and is capable of reflecting as well as transmitting predetermined proportions of the incident beam. These properties cause the beam 36 to divide into a reflected portion 44 comprised of one half the incident energy in beam 36 and a transmitted portion 46 which comprises the remaining one half of the energy.

The reflected beam portion 44 is applied to a conventional optical wedge 48 which is associated with a radiation-sensitive element 50. It will be observed that the fractional distribution of the incident energy effected by the beam splitters 32 and 42 has the effect of providing the radiation-sensitive elements 40 and 50 with energies of equal intensity.

The axis of the optical wedge 48 is polarized perpendicularly to the sensitive axis of the optical wedge 38. This perpendicularity causes the wedge 48 to remain utterly insensitive to the horizontal changes in beam direction which excite electrical signals within the radiation-sensitive element 40. As a result, wedge 48 acting with radiation-sensitive element 50 produce an electrical signal proportional only to vertical deviations in the position of the drogue unit with respect to the optical axis of the receiver unit 22.

The element 50 which acts in conjunction with wedge 48 is of the same type as the element 40 described immediately above and may similarly comprise a barrier layer device, a photoelectric cell, a photosensitive transistor, or the like, having the property of generating an output electromotive force which reflects the intensity of the radiation incident thereupon. As mentioned earlier, a photosensitive element such as lead sulphide cell may be used in the infra-red region with excellent results.

It will now be appreciated that the electrical voltages produced by radiation-sensitive elements 40 and 50 as a result of horizontal and vertical deflections in the position of the approaching drogue unit comprise signals which may be exploited on a rectangular coordinate basis to visually indicate the position of the drogue unit within the cockpit of the aircraft. In other words, the radiation-sensitive elements 40 and 50 generate separate signals which are each proportional on a rectangular coordinate basis to the displacement of the image of the radiant energy source 16 from the axis of the optical system.

The signals may be applied, via cable 52, to a conventional crossed-pointer type meter of the type identified by the reference numeral 54 in FIG. 2. In the meter 54, the point of intersection of the movable horizontal and vertical pointers indicates the spatial position of the drogue unit, and the meter readings indicate directly the number of degrees off-course in the horizontal and vertical planes. When the rectangular coordinate signals are applied to such a crossed-pointer type meter, a separate visual indication of the range between the radiation source and the receiver is required within the cockpit. This indication may be provided by means of conventional indicating meter 55 provided with a movable pointer which deflects across a series of indicated values. The scale of meter 55 may be calibrated to provide a linear response for remote values of range, and an expanded scale reading for the shorter values of range which occur as the contact point is approached. Since the intensity of the received signal used to operate this meter is substantially proportional to the square of the linear distance between the source 16 and the receiver, the linear portion of the meter scale gives an inverse exponential indication of the range. If desired, the meter sensitivity may be increased by using a scale calibration which is intermediate between a perfectly linear and a square law response. It will be noted that the meters 54 and 55 correspond to the cockpit indicator 24 generally designated in FIG. 1.

The rectangular coordinate signals may be also applied to a cathode ray oscilloscope in which the direction and distance of a luminescent spot from the center of the tube indicates the location of the drogue unit with respect to the probe, and either the intensity or size of the spot is made proportional to the relative range or remoteness of the drogue.

Figure 3:
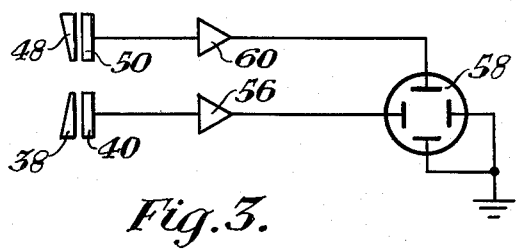
FIG. 3 is a diagram showing the application of the signals developed by the arrangement of FIG. 2 to a cathode ray oscilloscope cockpit indicator.

In FIG. 3, this application of the rectangular coordinate signals to a cathode ray oscilloscope is shown diagrammatically. There, the optical wedge 38 and associated sensitive element 40 are connected to a horizontal channel amplifier 56 which actuates the horizontal deflection plates of an oscilloscope 58. Conversely, the optical wedge 48 and associated element 50 provide an input signal to a vertical channel amplifier 60 which provides a potential to the vertical deflection plates of the oscilloscope 58. The amplifiers 56 and 60 form components of an intensity compensator circuit which is described in detail in connection with the circuitry shown in FIG. 5.

Returning to the description of FIG. 2, reference will now be made to the radiation-sensitive element 62 positioned to intercept transmitted beam 46 at the rear of the receiver unit 22. It will be appreciated in this connection that the detailed description thus far has been limited to explaining the method and means employed in developing voltages proportional to the Cartesian coordinates of the drogue unit with respect to the optical axis of the receiver unit 22. By using the electromotive force developed by the radiation-sensitive element 62, there is provided an electrical signal which serves as a reference, and assists in the measurement of the absolute intensity of the energy received from the radiant energy source 16. The amplitude of this signal provides a direct measure of the range, or closing distance between the drogue unit and the probe, and also provides a datum level for the displacement measurements.

It will be observed in this connection that the sensitive element 62 does not have any optical wedge positioned in front of it to intercept incident radiation, and is therefore radiation sensitive to the same degree across its entire surface. This means that the relative angular position of the transmitted beam 46 with respect to the optical axis of the system is immaterial insofar as the magnitude of the output electrical signal generated by the element 62 is concerned. Consequently, the element 62 is responsive only to the degree of proximity of the drogue unit 16, regardless of the angle at which the unit approaches.

The uniform sensitivity of the element 62 is exploited in compensating for the variations in signal strength which occur as the range increases or decreases. Because of the fact that the rectangular coordinate voltages generated by the sensitive elements 40 and 50 are proportional to the intensity of the radiation incident thereupon, the closing of the range between the probe and drogue unit presents a possibility for error. The stronger signal which is received by the horizontal and vertical radiation-sensitive elements as the drogue unit approaches, if uncorrected, would give the impression of successively larger horizontal and vertical displacements from the optical axis of the receiver unit 22. It will be thus obvious that the increased signal strength occasioned by decreasing range must be compensated for in some manner in order to prevent such erroneous visual indications of position displacement.

In order to accomplish this, the signal developed by the sensitive element 62 is electrically balanced against the displacement signals generated by the optical wedges and their associated radiation-sensitive wedges. The method by which this signal from a radiation-sensitive element having equal radiation sensitivity across its entire surface is utilized will be explained fully in connection with the detailed description of the circuitry depicted in FIG. 5. It is sufficient at the present stage of the specification to state that the compensation for variations in intensity is effected by balancing the voltage from element 62 against signals proportional to each of the rectangular coordinates of the drogue unit, so that the net value of the respective voltages supplied to the cockpit indicator is indicative of drogue displacement alone, unaffected by variations in the value of intensity which accompany changes in range.

Figure 4:
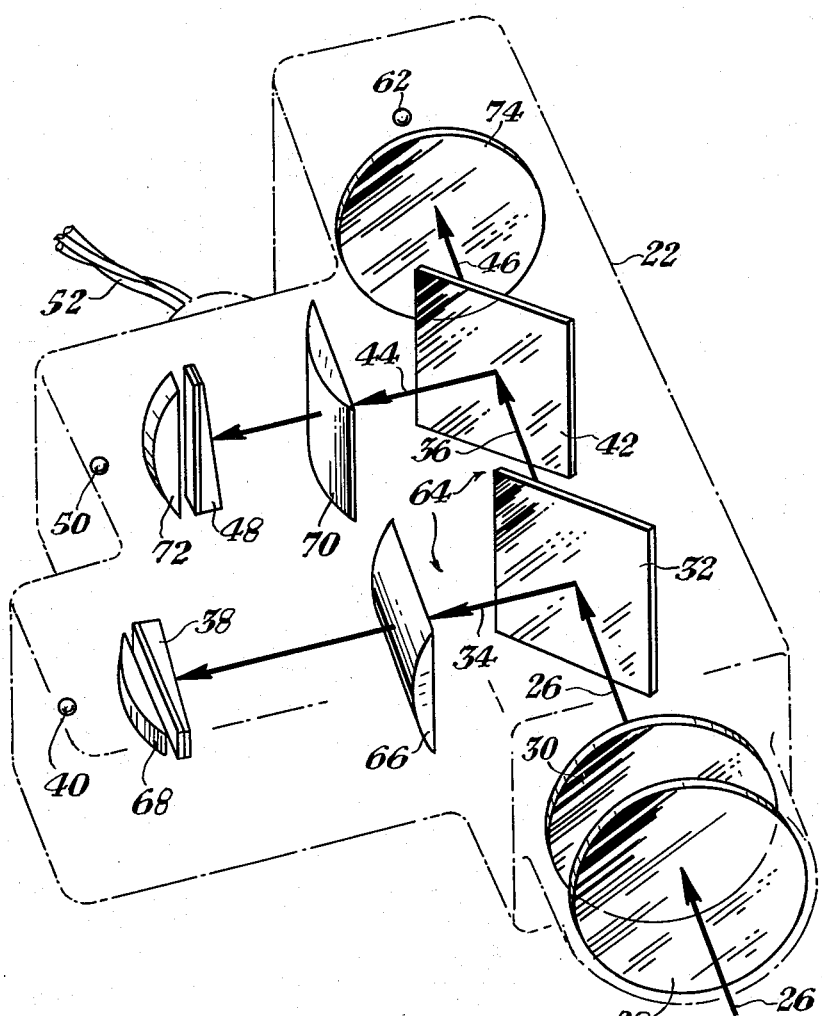
FIG. 4 is a schematic and perspective view of the basic arrangement depicted in FIG. 2, and illustrates the use of plano-cylindrical lenses in shaping the components of the received signals.

Continuing now with the detailed description of the invention, and turning to the embodiment of the invention shown in FIG. 4, the reference numeral 22 has been used to identify a receiver unit of the same general type as that shown in FIG. 2. To emphasize the points of similarity between FIG. 2 and FIG. 4, like numerals have been employed wherever possible to indicate like parts. Once again, the beam of radiant energy 26 emitted by the radiation source 16 is passed through a filter element 28, and collimated by means of a lens 30.

The collimated beam of energy is applied to a first beam splitter 32 which transmits two-thirds of the incident energy and causes the remaining one-third to propagate obliquely to its former direction and form a reflected portion 34.

The reflected portion 34 is applied to a plano-cylindrical lens 66 for additional focussing therein. After passing through the lens 66, the beam impinges upon an optical wedge 38 of the same type described in connection with FIG. 2. The portion of the beam permitted to penetrate the wedge 38 is applied to a plano-cylindrical lens 68 positioned directly behind the wedge.

After shaping within the lens 68, the reflected portion of the beam illuminates the radiation sensitive element 40. It will be observed that the element 40 shown in FIG. 4 is in the form of a small circular cell, rather than an oblong strip as shown in FIG. 2. In using an operating frequency within the infra-red spectrum for the source 16, the embodiment shown in FIG. 4 is preferred. Under these circumstances, the small circular radiation-sensitive elements 40 and 50 shown in FIG. 4 may comprise photosensitive lead sulphide cells, or the like, and the variations in infra-red radiation intensity are sampled by employing optical wedges such as the unit 38 disposed between the illustrated pair of spaced semi-cylindrical lens 66 and 68, respectively.

For detecting displacements in the vertical plane, the transmitted beam fraction 36 which penetrates the first beam splitter 32 is applied to a second beam splitter 42. The second beam splitter 42 allows a predetermined portion of the beam 46 to penetrate therethrough, and causes the remaining reflected portion 44 to propagate at an angle to its former direction. The portion 46 which actually penetrates the beam splitter comprises one-half the value of the incident radiation, and the reflected portion 44, of course, makes up the other half. This proportioning of the reflected fractions by the beam splitters causes the radiation-sensitive cells 40 and 50 to receive beams of radiant energy having substantially equal intensities.

The beam portion 44 reflected by the splitter 42 is directed through a plano-cylindrical lens 70 for additional shaping therein. After passing through the lens 70, the beam impinges upon an optical wedge 48 of the same type as described in connection with FIG. 2. The fraction of radiant energy emerging from the optical wedge 48 is directed through a plano-cylindrical lens 72. After shaping within the lens 72, the reflected portion of the beam illuminates a radiation-sensitive element 50. The form of the element 50 is similar to the previously described element 40 shown to the lower left, and comprises a small circular cell rather than the oblong strip depicted in FIG. 2. As earlier mentioned in this specification, the element 50 may comprise a photo-sensitive lead sulphide cell, or the like, for responding to infra-red radiation emitted by the radiation source 16 carried by the drogue unit.

The transmitted beam 46 which emerges from the second beam splitter 42 is applied to a spherical lens 74 for shaping and additional collimating. Beyond lens 74, the beam illuminates the surface of a radiation-sensitive element 62. The element 62 receives incident radiant energy through the lens 74 without the intervention of an optical wedge, or like device. The element 62 is therefore radiation-responsive to the same degree across its entire surface. This means that the relative angular position of the transmitted beam with respect to the optical axis of the system is immaterial insofar as the electrical output developed by the element 62 is concerned. This electrical output is used as a compensating signal to prevent erroneous visual indications of position displacement from occurring as a result of the change in received signal strength which accompanies decreasing range.

As will be explained in detail presently, this compensation is effected by balancing the voltage from element 62 against signals proportional to each of the rectangular coordinates of the drogue unit, so that the net value of the respective voltages supplied to the cockpit indicator is indicative of drogue displacement alone, undisturbed by the intensity variations which accompany changes in the range.

Figure 5:
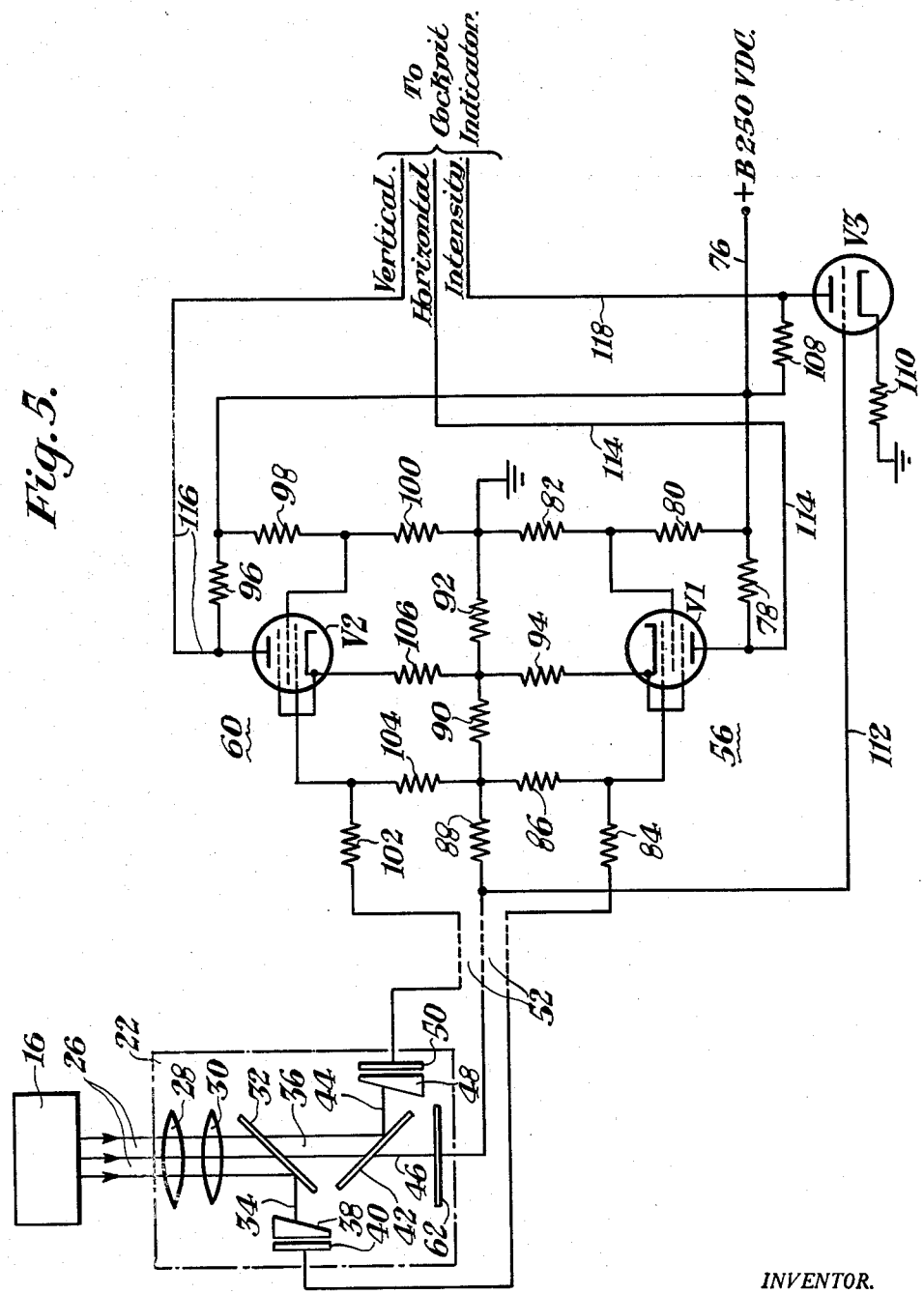
FIG. 5 is a circuit diagram of the interconnection for one form of intensity compensator circuit employed in practicing the invention.

Continuing with the detailed description of the invention, reference will now be made to the intensity compensator circuit of FIG. 5. The ability of this compensator circuit to eliminate the electrical effect of changing range, or of atmospheric effects such as sleet, fog, or rain, will become clear as the detailed description of the circuitry progresses. In FIG. 5, it will be observed that the radiant energy source 16 within the drogue unit is depicted diagrammatically as a block in the upper left-hand corner of the drawing. The division of the beam 26 into transmitted portions 34 and 44, and the illumination of the optical wedges 38 and 48 by these transmitted portions is shown. The output voltages developed by the wedge-covered radiation-sensitive elements 40 and 50, as well as by the sensitive element 62 are delivered, via cable 52, as input signals to the horizontal and vertical channel amplifiers 56 and 60, respectively. It should be appreciated in connection with FIG. 5 that suitable stages of conventional filter circuitry may be interconnected between the receiver unit 22 and the input to the respective horizontal and vertical channel amplifiers. Thus, where modulated bursts of energy are received from the radiation source 16 at a characteristic operating frequency, suitable band pass filters, or the like, may be employed to enhance the selectivity of the system. Since the signal from a modulated source of infra-red radiation may be readily detected by a tuned detector in the presence of much higher levels of unmodulated energy of the same wavelength, the efficiency of the circuitry is greatly improved. The intensity compensator circuit shown in FIG. 5 will, of course, operate equally well where an unmodulated source of radiation is employed.

The horizontal channel amplifier 56 in the intensity compensator circuit is seen to include a conventional pentode space discharge device V1 having its anode interconnected to the B-plus plate potential bus 76 through a plate load resistor 78. The suppressor grid of the pentode is cathode-connected in the usual manner, and the screen grid is interconnected to the B-plus plate potential bus 76 through a dropping resistor 80. The resistor 80 is connected to ground through a resistor 82. The control grid of the pentode V1 is connected, via resistor 84, to sample the output voltage developed by the sensitive element 40. The control grid is also coupled to the sensitive element 62 through the series-connected resistors 86 and 88. The cathode biasing resistor 94 for tube V1 is interconnected between the cathode of the tube and the juncture between the resistors 90 and 92.

It will be observed in this connection that the juncture between resistors 86 and 88 is connected to ground through the series-connected resistors 90 and 92. The method by which the current drawn through the resistors 88, 90 and 92 controls the bias on the amplifiers, and compensates for the changes in intensity will become clear as the description proceeds.

The components and circuitry of the vertical channel amplifier 60 are analogous in every respect to those described in detail in connection with the horizontal channel amplifier. Thus, the tube V2 comprises a conventional pentode connected to the B-plus plate potential bus 76 through a plate load resistor 96. The screen grid is coupled to the B-plus plate potential bus through a dropping resistor 98, which is connected to ground through a resistor 100. The control grid of the pentode V2 is connected, via resistor 102, to sample the output potential developed by the sensitive element 50. The control grid is also coupled to the sensitive element 62 through the resistors 104 and 88. The cathode biasing resistor 106 for the tube V2 is interconnected between the cathode and the juncture between the resistors 90 and 92. It should be observed that the triode tube V3 in the lower right corner of the drawing is connected to provide a signal proportional to the voltage developed by the radiation-sensitive element 62. The triode V3 is connected to the B-plus plate potential bus 76 through resistor 108. In addition, the triode is provided with a conventional cathode biasing resistor 110, and is connected to receive a control grid signal directly from the sensitive element 62, via conductor 112.

In operation, the circuit shown in FIG. 5 provides a pair of voltages proportional to the rectangular coordinates of the drogue and a third signal indicative of the relative closeness or proximity of the drogue unit. The conductor 114 which is connected directly to the anode of V1 makes available a first voltage related to the lateral displacement of the drogue unit. The conductor 116 coupled to the anode of V2 conveys a voltage related to the vertical displacement of the drogue unit, and the conductor 118 carries a voltage proportional to the relative proximity or range of the drogue unit.

As mentioned earlier in this specification, the rectangular coordinate voltages available on conductors 116 and 114 may be applied to the deflection plates of a conventional cathode ray oscilloscope. The range signal from conductor 118 may be applied to the control grid, or one of the focussing anodes of such an oscilloscope in order to modulate either the brightness or size of the luminous cathode spot.

Alternatively, the rectangular coordinate voltages may be applied to the conventional crossed-pointer type meter 54, as discussed in connection with FIG. 2. Under these circumstances, as shown, the range signal from conductor 118 is applied to the separate indicating meter 55 in order to provide a visual indication of the range between the drogue unit and the probe unit carried on the receiver airplane.

Returning again to the description of the circuitry and components of the intensity compensator circuit shown in FIG. 5, the detailed theory of operation will now be presented. The positive potential provided by the B-plus plate potential bus 76 causes an electron current to flow through the pentodes V1 and V2. This electron current, of course, flows through the common resistor 92, the respective cathode resistors 94 and 106, and the respective plate load resistors 78 and 96.

The radiant energy received from the source 16 is sampled by the beam splitters 32 and 42 and illuminates the optical wedges 38 and 48. The energy which penetrates the optical wedges 38 and 48 is applied to the radiation-sensitive elements 40 and 50, to provide voltages proportional to the X-axis and Y-axis displacements of the drogue unit. The energy incident upon the sensitive element 62 develops a voltage related only to the relative proximity of the drogue unit. As will be explained in detail presently, this voltage is applied to the amplifiers to compensate for changes in intensity, and eliminate the effects of rain, fog, sleet, and other obscuring atmospheric phenomena which may intervene between the radiation source 16 and the receiver unit 22.

Returning again to FIG. 5, the voltages developed by the radiation-sensitive elements 40 and 50 are coupled to the grids of the pentode tubes V1 and V2 in the horizontal and vertical channel amplifiers 56 and 60, respectively. These voltages act to modulate the conductivity of the pentodes V1 and V2 and produce amplified voltage variations at the respective anodes which reflect the horizontal and vertical deviations of the drogue unit. It will be appreciated that the control grids of the pentodes V1 and V2 are also under the control of the radiation-sensitive element 62.

The increased voltage which is developed by element 62 as the drogue approaches generates an increasingly positive voltage drop across the series-connected resistors 90 and 92. The resistors 86 and 104 are connected to apply this increasingly positive potential to the control grids of the pentodes V1 and V2 provided in the horizontal and vertical channels, respectively. The conductors 114 and 116 are available to couple the amplified rectangular coordinate voltages developed by V1 and V2 into the cockpit indicator, as earlier explained in this specification.

It should be appreciated at this point that the cathode resistors 94 and 106 for tubes V1 and V2 are connected to the common point between the resistor 90 and the grounded resistor 92. The ohmic values of the cathode resistors 94, 106 and the grounded resistor 92 must be selected and coordinated with the particular pentode types so that the tubes V1 and V2 are compelled to operate upon the curved portion of their characteristic curves. This, of course, causes the output potentials available on conductors 114 and 116 to assume values proportional to an exponential function of the input signals supplied the amplifiers.

It will be appreciated from the preceding disclosure that the approach of the drogue unit will occasion a sharp increase in the intensity of the radiation detected by the sensitive element 62. This increased intensity causes the element 62 to develop an increasingly larger voltage. As a result, the current drawn through the series-connected resistors 88, 90 and 92 increases sharply, and effects a correspondingly larger voltage drop across all of the three resistors.

Since the voltage drop across resistor 92 directly affects the potential of the cathode elements of tubes V1 and V2, and shifts the effective bias voltage applied thereto, it will be understood that the over-all gain of the horizonal and vertical amplifier channels is directly controlled by the changes in the intensity of the received signal detected by the element 62.

The method of operation of the gain control effected in FIG. 5 is believed clear. It may be now appreciated that the sensitivity of the horizontal and vertical amplifier channels is regulated by the intensity of the illumination incident upon the element 62, and that in each case the net voltage made available upon conductors 114 and 116 comprise an accurate measure of drogue position which is unaffected by changes in radiation intensity. Thus, when rain, sleet, fog, or other similar obscuring atmospheric phenomena intervene between the source 16 and the receiver 22, and the intensity of the radiant energy striking the pickup 62 decreases, an immediate increase in the gain of the amplifiers 56 and 60 compensates for the effect of the phenomena. It should be noted in this connection that the amplified range signal developed by triode V3 is not subject to a condition-responsive biasing potential and therefore comprises a precise representation of the relative range or proximity of the drogue unit.

In concluding the portion of the specification dealing with the intensity compensator circuit shown in FIG. 5, an illustrative tabular schedule of values and tube types is set forth. It will be appreciated that the specific entries in the table are by no means the only possible entries, and that the table is for the purpose of illustration rather than limitation.

| Resistor | Kilo-ohms | Resistor | Kilo-ohms | Resistor | Kilo-ohms |
| --- | --- | --- | --- | --- | --- |
| 78 | 270 | 80 | 50 | 82 | 50 |
| 84 | 100 | 86 | 200 | 88 | 200 |
| 90 | 200 | 92 | 200 | 94 | 1 |
| 98 | 270 | 100 | 50 | 102 | 100 |
|  |  | 106 | 1 | 108 | 100 |
|  |  | 110 | 5 |  |  |

TUBES

| | |
| --- | --- |
| V1 | 6BA6 pentode. |
| V2 | 6BA6 pentode. |
| V3 | 6C4 triode. |

Figure 6:
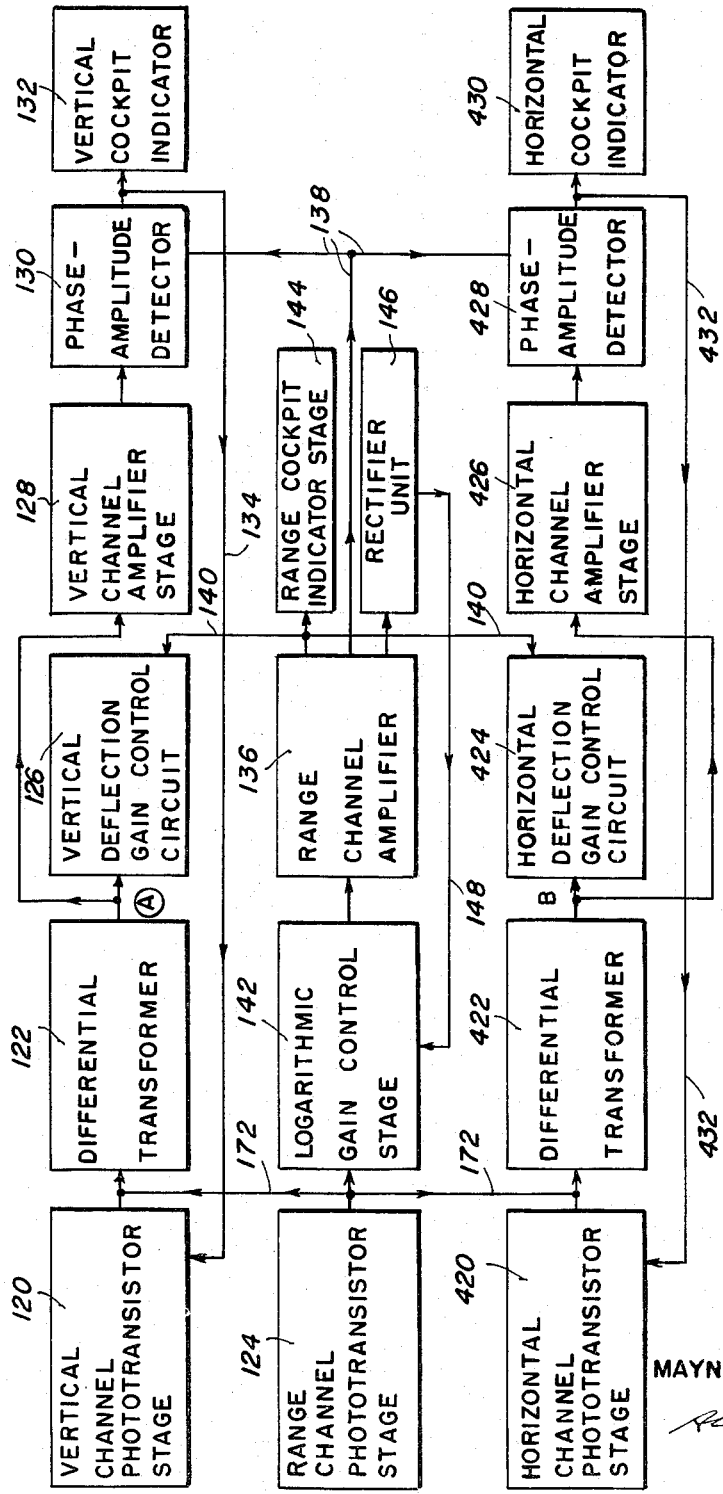
FIG. 6 is a block diagram of the components and interconnections of a second form of intensity compensator circuit employed in practicing the invention.

Continuing with the description of the invention, reference will now be made to the intensity compensator circuit shown in block diagram in FIG. 6. In order to lay a basis for the detailed theory of operation of the circuitry illustrated in the remainder of the patent drawings, an explanation of the interrelationship between the components shown in FIG. 6 is necessary. As will be evident to those skilled in the art, the vertical and horizontal channels shown in FIG. 6 each comprise null balance servo loops.

In FIG. 6, the numeral 120 is used to designate a vertical channel phototransistor stage. The stage 120 includes a conventional semiconductor element such as a transistor which has the capacity to develop an output current related to the intensity of the radiant energy incident thereupon. As will be explained more fully below, the semi-conductor element within the phototransistor stage 120 is connected in series with a parallel connected L-C circuit. This L-C circuit may be adjusted to resonate at the frequency of the energy received from a modulated source of radiant energy. The particular portion of the incident radiant energy sampled by the stage 120 is, of course, the vertical component of the signal emitted by the source 16 within the drogue unit. It will be recalled that the vertical component may be selectively extracted from the total beam by the ingenious arrangement of beam splitters and optical wedges earlier referred to in connection with the explanation of the receiver units illustrated in FIG. 2 and FIG. 4. The output voltage developed by the stage 120 is utilized as a portion of the total input signal which is supplied to a differential transformer stage 122. The remainder of the input signal for the transformer stage 122 is taken from the output terminals of the range channel phototransistor stage 124, shown immediately below the vertical channel stage 120. It will be recalled in this connection that the signal which the range channel develops is proportional only to the relative proximity of the radiation source 16, and is unaffected by the angularity of the signal beam with respect to the optical axis of the receiving equipment. The output voltage developed by the range channel phototransistor stage is adjusted to equal the output signal from the vertical and horizontal channels when the respective vertical and horizontal deviations of the drogue unit are zero.

By connecting the output terminals from the range channel phototransistor stage 124 to the input of the differential transformer 122, the signal developed in the vertical channel is proportional only to the vertical displacement of the radiant energy source 16, and independent of changes in the range. This is because the differential transformer 122 is responsive to the ratio of the intensities of the energy illuminating the respective vertical channel and range phototransistors. The application to transformer 122 of the ratio between energy which has traversed an optical wedge, and energy which has not traversed such a device prevents erroneous vertical deflection signals from being caused by the higher signal intensity which accompanies diminutions in range. In discussing the operation of the differential transformer 122, it should be mentioned that the output voltage thereof may, if desired, be passed through suitable stage of conventional filter circuitry. Thus, suitable band pass filters tuned to the modulating frequency of the infra-red radiation source may be employed to enhance the selectivity of the system. Since the signal from a modulated source of infra-red radiation may be readily detected in the presence of much greater levels of unmodulated energy of the same frequency, the use of such filter circuitry may be deemed desirable under some circumstances.

The output voltage developed by stage 122 is applied to a vertical deflection gain control circuit 126. Between the transformer 122 and the gain control circuit 126 a terminal "A" has been designated. The gain control circuit 126 is provided with circuitry and components which cause the terminal "A" to assume varying voltages with respect to a reference potential. In other words, the magnitude with respect to ground of the positive or negative voltages developed at terminal "A" is directly controlled by the operation of the gain control circuit 126. Since the voltage at terminal "A" forms the input signal for the successive stages of circuitry in the vertical channel, the contribution of the gain control circuit 126 is vital to the overall operation of the channel.

As will be evident from FIG. 6, the potential available at terminal "A" is connected directly to the input of vertical channel amplifier stage 128. In practicing the invention, a gain of approximately 40 decibels for the amplifier stage 128 was found to yield excellent results. After enlargement within the stage 128, the voltage is applied as an input signal to a phase-amplitude detector 130. The detector 130 may include suitable circuitry for developing a unidirectional potential having a magnitude proportional to the deflection of the approaching drogue unit in the vertical plane. This potential is applied to the vertical cockpit indicator 132, shown immediately to the right. It should be noted that a portion of the unidirectional output signal developed by the detector 130 is utilized as an automatic gain control signal for the vertical channel. The feedback line 134 which carries the gain control signal back to the phototransistor stage 120 is illustrated below the component blocks in the vertical channel.

The phase-amplitude detector 130 is capable of discriminating between upward and downward vertical movement by the drogue unit, and effecting a corresponding reversal in the polarity of the voltage supplied the cockpit indicator 132. As will be explained more fully later in the specification, this discrimination is effected by comparing the phase of the signal in the vertical channel with the phase of the signal traveling in the range channel. Provision for this comparison is indicated diagrammatically in FIG. 6, in which a periodic output potential is coupled from the range channel amplifier 136 into the phase-amplitude detector, via common phase-signal conductors 138.

The output signal developed by the phase-amplitude detector 130 comprises a unidirectional voltage which undergoes polarity reversals indicative of relative upward or downward movements. This signal is coupled directly into the vertical cockpit indicator 132. The indicator 132 may comprise a conventional zero-center D'Arsonval galvanometer, in which deflections to the left or right of zero indicate upward or downward deviations from the optical axis of the receiver. Alternatively, the reference numeral 132 may generically designate circuitry for applying the output signal from detector 130 to the vertical deflection plates of a conventional cathode ray oscilloscope. In this case, the ultimate signal developed by the horizontal channel shown in the lower portion of FIG. 6 is applied to the horizontal deflection plates of the same oscilloscope, and the range signal is used to modulate the size or intensity of the luminous spot on the oscilloscope screen.

Turning now to the theory of signal magnitude control as employed in the vertical channel, reference to the gain control circuit 126 is again made. As explained immediately above, the voltage at terminal "A" forms the input signal for all succeeding stages of circuitry in the vertical channel. The relative positivity or negativity of this terminal "A" is directly controlled by the operation of the gain control circuit 126.

However, the gain control circuit 126 receives regulating potential, via conductor 140, directly from the range channel amplifier 136 shown immediately below, and is continuously subject to the operational control thereof. In practicing the invention, an amplifier gain of approximately 60 decibels for the amplifier 136 was found adequate. Since the character of the regulating potential produced by the range channel amplifier 136 is determined by the output signals generated by the logarithmic gain control stage 142, brief reference to this range channel component will now be made.

As mentioned earlier in connection with the form of intensity compensator circuit illustrated in FIG. 5, the signal correction which is necessitated by varying values of range must comprise an exponential function of the intensity of the incoming radiation. A linear function of this intensity is completely unable to provide gain control potential.

This is because the indications produced by both the vertical and horizontal channels are proportional to the angular displacement of the radiation source with respect to the optical center line of the receiver unit. Since the intensity of the received radiation bears a square law relationship to the values of range, the need for an exponentially related correction signal is believed apparent. In the type of intensity compensator circuit shown in FIG. 5, it will be recalled, the required exponential relationship was obtained by correlating the specific type of pentode tube with the ohmic values of the resistors, in order to have the range signal effective upon the non-linear portion of the characteristic curve for the tubes.

The logarithmic gain control stage 142 effects the required exponential response in a different manner. It is sufficient at the present stage of the detailed description to state that the stage 142 provides an output signal which is proporional over a range of at least 60 decibels to the logarithm of the input signal delivered by the range channel phototransistor stage 124.

The logarithmic, or exponential character of the automatic gain control effected in the vertical channel will now be appreciated. The potential of point "A" in the vertical channel comprises the input signal for the remainder of the vertical channel circuitry. This potential, however, is directly controlled by the operation of the gain control circuit 126. The gain control circuit 126, in turn, receives its regulating potential directly from the range channel amplifier 136 which receives a form of input signal determined entirely by the logarithmic gain control stage 142. In sum, then, the correctional signal provided at terminal "A" in the range channel is characterized, at least in part, by a magnitude which is exponentially related to the intensity of the radiant energy received by the range channel phototransistor stage. It will, of course, be appreciated that the output signal voltage produced by differential transformer 122 is also superimposed upon terminal "A," and is coupled to the input of the vertical channel amplifier stage 128 therefrom.

Returning to the block diagram of the range channel in FIG. 6, for the completion of the description thereof, the output voltage developed by the range channel amplifier 136 is connected to feed a range cockpit indicator stage 144. The indicator stage 144 may include suitable circuitry for developing a unidirectional potential with a magnitude proportional to the relative proximity of the drogue unit 14. Visual display of this variable may be made by means of a conventional D'Arsonval galvanometer movement. Where a cathode-ray oscilloscope is preferred as the cockpit indicator, the numeral 144 denotes circuitry for applying the unidirectional range signal to modulate the size or intensity of a luminous cathode spot.

The range channel amplifier also produces an input signal for a rectifier unit 146. The unit 146 may comprise a full wave rectifier connected to provide a unidirectional automatic gain control signal for the range channel. This signal is conveyed back to the logarithmic gain control stage 142, via feedback line 148. The line 148 may, of course, carry one or more conductors therewithin. In concluding the description of the range channel components, it should be mentioned that the use of the phase-signal conductors 138 for coupling the output from the amplifier 136 to the phase amplitude detector 138 has been already discussed in the explanation of vertical channel.

Figure 7:
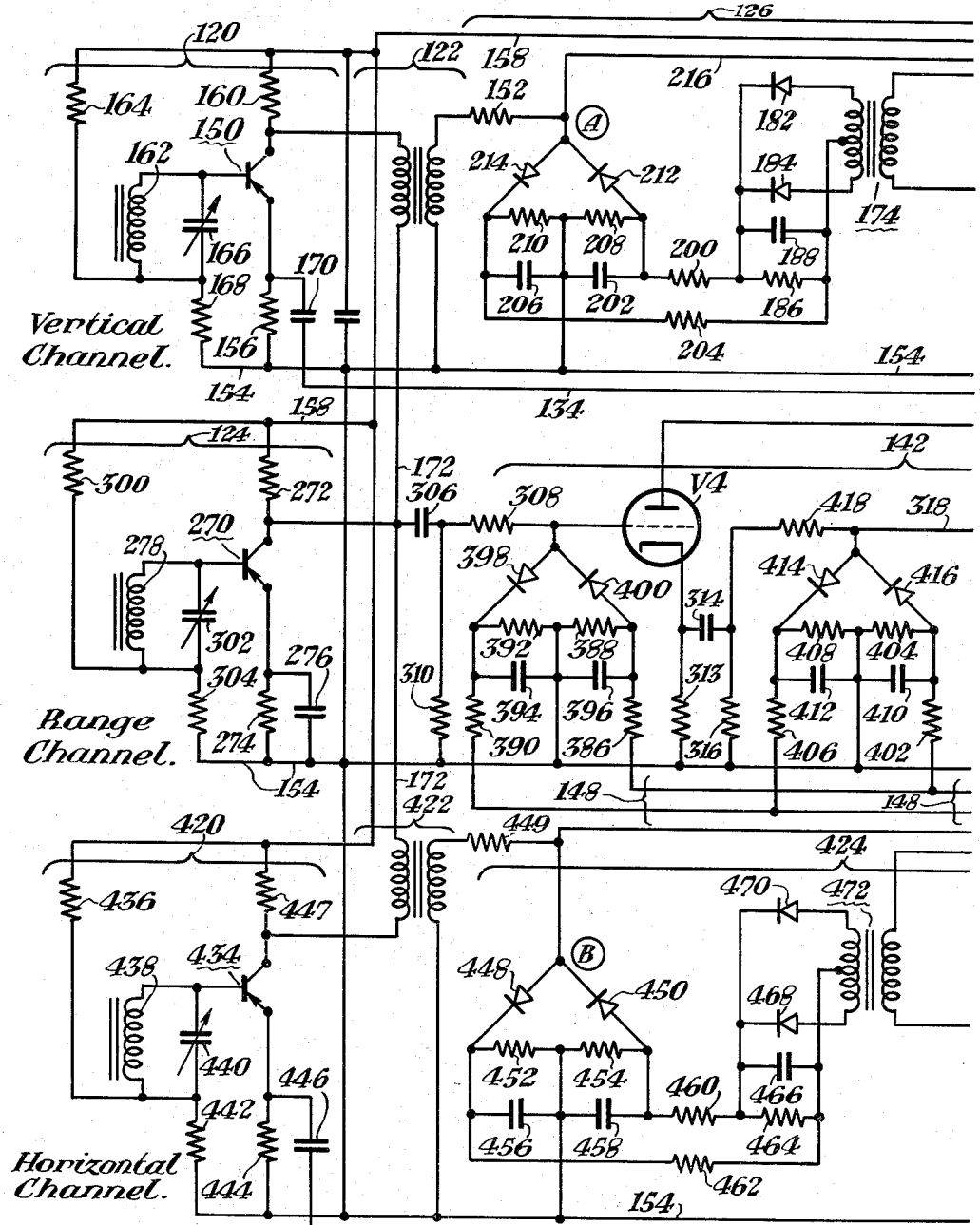
FIGS. 7, 7a and 7b are circuit diagrams of the interconnections depicted in block diagram form in FIG. 6.
Figure 7A:
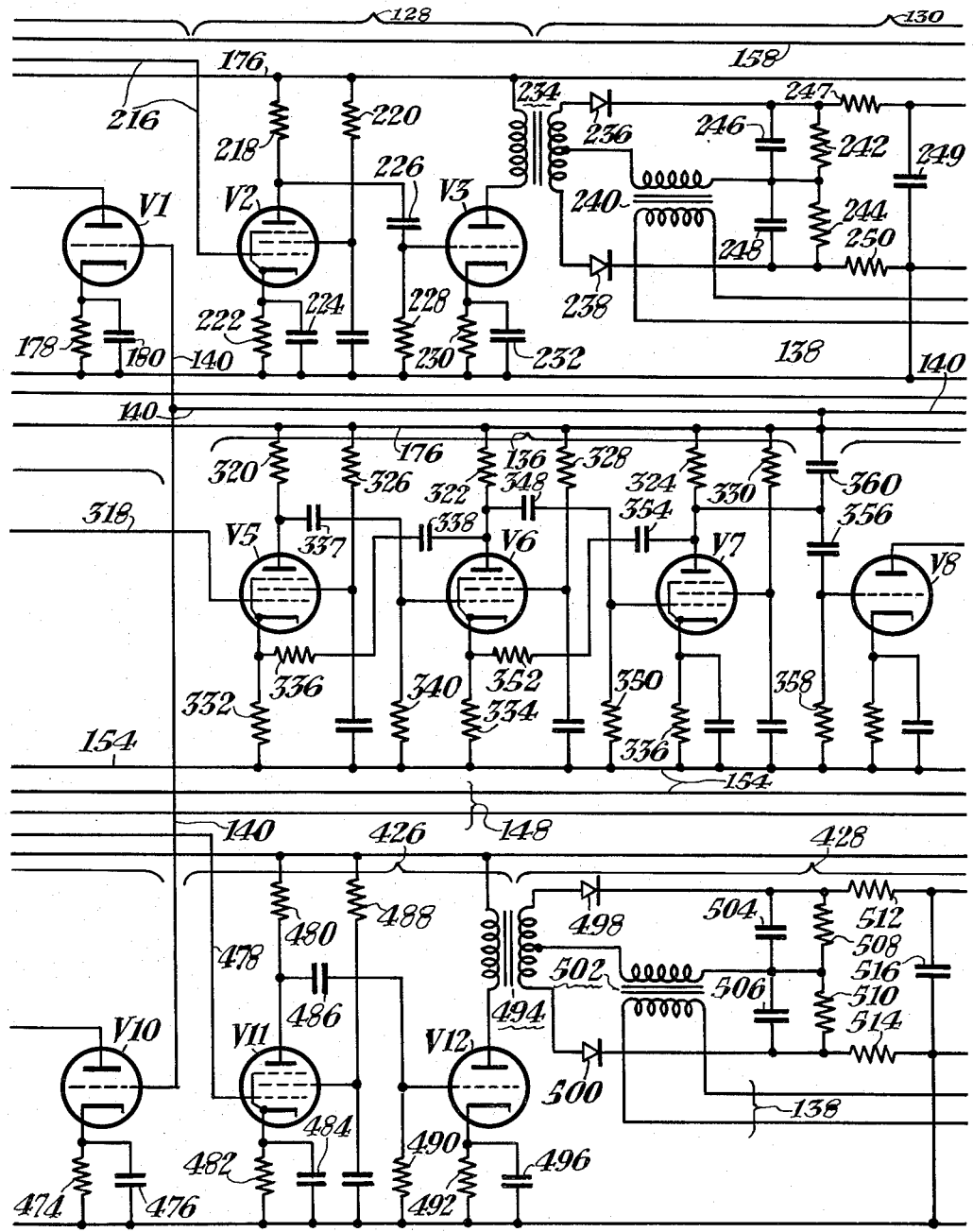
Figure 7B:
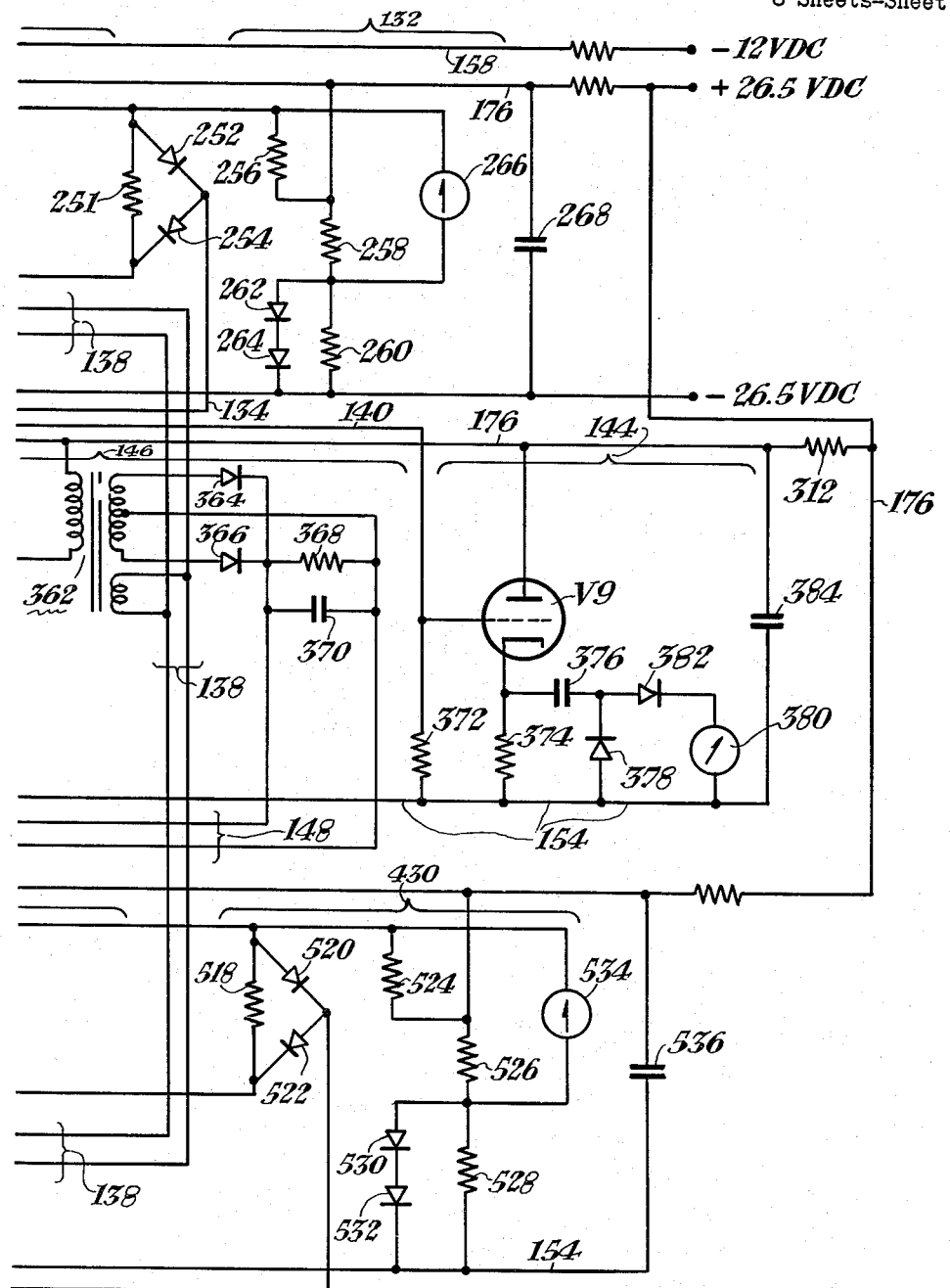

With the description of the block diagram in FIG. 6 as a background, reference will now be made to the details of the circuitry and components as illustrated in FIG. 7, FIG. 7a, and FIG. 7b. Whenever possible, the portions of the circuitry which correspond with the blocks in FIG. 6 have been designated by brackets, and identified by means of the same reference numerals.

Thus, in FIG. 7, the portions of the circuitry beneath the bracket 120 correspond to the vertical channel phototransistor stage 120 depicted in FIG. 6. The stage 120 shown in the extreme upper left-hand portion of FIG. 7 includes a conventional plural element phototransistor 150 provided with base, collector and emitter electrodes.

The emitter electrode of the transistor 150 is connected to the B-minus bus 154 through a resistor 156. The collector electrode is coupled to the negative supply bus 158, via resistor 160. The base electrode is connected to the negative supply bus 158 through an iron core coil 162 which is connected in series with a resistor 164. The iron core coil 162 is shunted by a variable capacitor 166 which is connected through a resistor 168 to the B-minus bus 154. By varying the capacitance of the unit 166, the L-C circuit comprised of coil 162 and capacitor 166 is caused to become parallel resonant at the frequency of the received bursts of modulated energy.

The resistor 156, connected in the emitter line of the phototransistor, is shunted by a by-pass condenser 170. One plate of the by-pass condenser is connected directly to the emitter electrode of the transistor, and the opposite plate is coupled to the feedback line 134 which extends rightwardly to the output terminals of the phase-amplitude detector 130, as seen most clearly in the block diagram provided in FIG. 6.

The output potential developed by the differential transformer 122 is connected, via terminal "A," to the vertical deflection gain circuit beneath the brackets designated by the reference numeral 126. It should be observed that reference to FIG. 7a is necessary in order to examine the gain control circuit 126 in its entirety. In FIG. 7a, the gain control circuit 126 is seen to include a triode tube V1. The anode of triode V1 is connected through the primary winding of a transformer 174 to the B-plus supply bus 176. The cathode of V1 is connected to the B-minus bus 154 through a resistor 178 and shunt connected capacitor 180.

It is important to note that the control grid electrode of the triode V1 is energized, via conductor 140, from the output of the range channel amplifier 136, designated by means of brackets in the center of FIG. 7a. It was earlier stated in connection with the block diagram shown in FIG. 6 that the vertical gain control channel 126 is continuously subject to the control of the range channel amplifier 136. The control of triode V1 by the output of the range channel amplifier 136 is the means used to effect this control.

Returning to the description of the gain control circuit 126, and more particularly to the portion thereof illustrated in the upper right-hand portion of FIG. 7, attention is again directed to the transformer 174. As mentioned immediately above, the primary winding of this transformer is interconnected in the anode line of the triode V1.

The opposite ends of the tapped secondary winding of transformer 174 are connected in series through a pair of commonly connected and oppositely poled diodes 182 and 184. These diodes may comprise conventional unilaterally conductive barrier layer or semi-conductor de-devices of any suitable type. The manner by which these diodes and the associated components rectify and filter the periodic voltage applied thereto will be appreciated more fully as the specification proceeds.

A resistor 186 and a capacitor 188 are coupled in parallel between the tap junction on the secondary winding of the transformer 174 and the common connection between the diodes 182 and 184. One end of the resistor 186 is coupled to the B-minus bus 154 through a resistor 200 and capacitor 202 connected in series. The opposite end of resistor 186 is similarly coupled to the B-minus bus through a resistor 204 and capacitor 206 connected in series.

The capacitors 202 and 206 are shunted by a pair of resistors 208 and 210, connected across the plates of the respective capacitors. The resistors 208 and 210 are shunted by a pair of series connected diodes 212 and 214. The common junction between the diodes is connected directly to terminal "A" to regulate the magnitude of the potential which exists at this point.

In operation, the development of a large periodic output voltage by the range channel amplifier 136 (FIG. 7a) makes available an increasingly positive voltage which is applied directly to the grid of triode V1, via conductor 140. As a result, the magnitude of the periodic current flowing in the anode circuit of triode V1 increases sharply. This, of course, induces correspondingly larger potentials across the secondary winding of the transformer 174. The diodes 182 and 184 act in conjunction with the component resistors and capacitors of the secondary circuit to rectify and smooth the alternating voltage produced by the secondary winding of transformer 174. As a result, the automatic gain control signal available at terminal "A" takes the form of a unidirectional voltage which is able to control the apparent magnitude of the input signal as it appears to the subsequent stages of circuiting beyond terminal "A."

From terminal "A" the input signal is coupled, by a conductor 216, into the input of the vertical channel amplifier stage 128. In FIG. 7a, the components and circuitry of this amplifier stage are illustrated beneath the bracket identified by the reference numeral 128. The stage 128 may include a conventional pentode tube V2. The anode of the pentode is connected to the B-plus supply bus 176 through a resistor 218. The screen grid is similarly coupled to the B-plus supply bus through a dropping resistor 220. The cathode of the tube V2 is coupled to the B-minus bus 154 through a resistor 222 and shunt connected capacitor 224.

The amplified output signal developed by pentode V2 is applied through a coupling capacitor 226 to the control grid of a triode tube V3. The triode V3 is, of course, provided with the usual grid leak resistor 228. A resistor 230 and capacitor 232 are coupled in parallel and connected between the cathode of the tube V3 and the B-minus bus 154.

The amplified plate-line current flowing through the triode V3 traverses the primary winding of a transformer 234. The voltage induced across the tapped secondary winding of the transformer 234 comprises the input signal for the phase-amplitude detector 130 designated by the brackets immediately above the diagram.

Continuing with the detailed description of the vertical channel, the interconnection of the circuitry and components of the phase-amplitude detector 130 will now be explained. The periodic current flowing through the primary winding of transformer 234 induces a corresponding periodic potential across the tapped secondary winding of the transformer. The upper and lower ends of this secondary winding are connected to feed corresponding terminals on a pair of diodes 236 and 238 respectively. The tap junction on transformer 234 is connected to one end of the secondary winding of a transformer 240. The opposite end of the secondary winding of transformer 240 is coupled back to the diode 236 through a resistor 242. The opposite end of the secondary winding is also coupled back to the diode 238 through resistor 244. The two resistors 242 and 244 are shunted by individual capacitors 246 and 248 respectively. The opposite ends of the resistors 242 and 244 are connected in parallel with a series network comprised of resistor 247, capacitor 249, and resistor 250. The capacitor 249, the central element in this series network, is shunted by a resistor 251.

A pair of commonly connected diodes 252 and 254 are connected in parallel with the resistor 251. The common junction between the diodes is connected to the feedback line 134 which connects to the by-pass condenser 170 within the phototransistor stage 120, shown in the extreme upper left of FIG. 7. In operation, the diodes 252 and 254 each present a nonlinear impedance which varies in accordance with the magnitude of the voltage impressed thereacross. By connecting this nonlinear impedance in series with the by-pass condenser 170, the gain of the phototransistor is caused to vary in accordance with changes in output voltage developed by the phase-amplitude detector 130. In operation, the effective gain of the vertical channel phototransistor 150 is controlled by the bias voltage which is applied to the two diodes 252 and 254. A gain variation which holds a linear relationship to applied bias voltage over a four-to-one range is obtained in this manner by employing commercially available silicon diodes, and pre-biasing the diodes from the D.C. supply bus to a point in the center of the range. Under these circumstances, the output voltage from the phase-amplitude detector either aids or opposes the fixed bias voltage, depending upon whether the output signal from the range channel phototransistor is higher or lower than that of the vertical channel phototransistor. Thus, the output voltage of the phase-amplitude detector either aids or opposes the fixed bias voltage, depending upon whether the output signal from the range channel phototransistor is higher or lower than that of the vertical channel phototransistor. Thus, the output voltage of the phase-amplitude detector either increases or decreases the gain of the vertical channel phototransistor until its output voltage approximately equals that of the range unit. The output of the phase-amplitude detector then provides an accurate indication of the magnitude and direction of the distance between the probe and the drogue unit.

Turning now to the detailed description of the components of the cockpit indicator 132, as illustrated below the brackets designated by this reference numeral, it will be observed that three series connected resistors 256, 258, and 260 are coupled between the B-minus bus 154 and the common junction between resistor 251 and diode 252. The common junction between the resistors 256 and 258 is connected to the B-plus supply bus 176. The resistor 260 is shunted by a pair of series connected diodes 262 and 264.

A conventional zero-center type microammeter 266 is connected in parallel with the resistors 256 and 258. In practicing the invention, an instrument having 200 microampere full scale deflection at opposite ends of the scale was found to yield excellent results. To the right of the microammeter 266, a stabilizing capacitor 268 forms the final element in the chain of circuitry which makes up the vertical channel.

Turning now to the detailed description of the circuitry and components of the range channel, reference will again be made to FIG. 7. In the central portion of this drawing, the range channel phototransistor stage is seen to include the components beneath the bracket identified by the numeral 124.

The stage 124 includes a conventional phototransistor 270 provided with base, emitter and collector electrodes. Operating potential for the collector electrode is applied from the negative supply bus 158 through a resistor 272. The emitter electrode is connected to the B-minus bus 154 through a resistor 274 and shunt capacitor 276. The base electrode of transistor 270 is connected to the negative supply bus 158 through an iron core coil 278 which is connected in series with a resistor 300. The iron core coil is shunted by variable capacitor 302 which is connected through resistor 304 to the B-minus bus 154. The value of capacitor 302 may be varied in order to cause it to resonate with the coil 302 at the frequency of the energy received from a modulated radiation source. The output signal generated by the range channel phototransistor stage 124 is applied to the differential transformer 122 in the vertical channel immediately above, as earlier explained. The same signal is applied to the control grid of a triode tube V4, via coupling condenser 306 and resistors 308 and 310.

The triode V4, of course, comprises the input tube in the circuitry for the logarithmic gain control stage 142 illustrated in FIG. 7 and FIG. 7a and identified by the brackets and reference numeral in the center of these figures. The anode of the triode tube V4 is connected to the B-plus supply bus 176 through a resistor 312 shown in the extreme right-hand portion in FIG. 7b. The cathode of tube V4 is interconnected to the B-minus bus 154 through a resistor 313. The resistor 313 is shunted by a capacitor 314 and resistor 316 connected in series.

The output signal from the gain control stage 142 is coupled into the range channel amplifier 136, via conductor 318. More particularly, conductor 318 applies the output potential developed by the logarithmic gain control stage 142 to the control grid of the pentode tube V5 shown in FIG. 7a. It should be appreciated that the tube V5 comprises the input pentode in the range channel amplifier 136. Attention is also directed to the fact that the input signal for the amplifier 136 is developed across the resistor 313 connected in the cathode line of triode V4 in the logarithmic gain control stage 142. Both the grid and cathode potentials of the triode V4 are controlled by pairs of non-linear diodes which act in conjunction with groups of associated resistors and capacitors. The function of these grid and cathode networks is to cause triode V4 to generate an output voltage proportional to the logarithm of the amplitude of the input signal over a range of at least 60 decibels.

Deferring temporarily the detailed description of the grid and cathode networks in the logarithmic gain control stage 142, attention is again directed to the range channel amplifier 136. It will be recalled that the tube V5 has already been identified as the input pentode in this amplifier. In addition to the tube V5, however, the range channel amplifier also includes the pentode tubes V6 and V7. The pentodes V6 and V7, as well as the input pentode V5, are connected to the B-plus plate supply bus 176 through plate load resistors 322, 324, and 320 respectively. Screen grid potentials are applied the respective pentodes V5, V6 and V7 through the resistors 326, 328, and 330.

The cathodes of the pentodes V5, V6 and V7 are coupled to the B-minus bus 154 through resistors 332, 334, and 336, respectively. The amplified output signal from the input pentode V5 is coupled to the control grid of pentode V6, via condenser 337 and grid leak resistor 340. The cathode of V5 is interconnected to the anode of tube V6 via resistor 336 and capacitor 338.

The amplified output from pentode V6 is coupled to the control grid of pentode V7, via condenser 348 and grid leak resistor 350. The cathode of pentode V6 is interconnected to the anode of V7 through resistor 352 and capacitor 354. The ultimate output signal developed by the range channel amplifier 136 at the anode of V7 is applied to the control grid electrode of triode V8, via coupling condenser 356 and grid leak resistor 358. The ultimate output signal from the amplifier 136 forms the regulating potential for the vertical deflection gain control circuit 126, immediately above, as earlier explained. This regulating potential, as developed at the anode V7, is coupled through capacitor 360 to the conductor 140 which applies it to the control grid of the triode V1 within the gain control circuit 126.

Continuing now with the description of the successive stages of circuitry in the range channel, it will be recalled that the numeral 146 in the block diagram of FIG. 6 was used to designate a rectifier unit. The elements beneath the brackets marked 146 in FIG. 7a and FIG. 7b comprise the circuitry and components of this rectifier unit. The triode tube V8 forms the input tube for the rectifier unit 146. The anode of triode V8 is interconnected to the B-plus supply bus 176 through the primary winding of a transformer 362. It will be noted that transformer 362 is provided with two separate secondary windings, one of which is equipped with a tap junction. The opposite ends of the tapped secondary winding are connected to corresponding terminals of a pair of commonly connected diodes 364 and 366.

In discussing the transformer 362 in FIG. 7b, reference to the function of the additional secondary winding in energizing the phase-signal conductors 138 should be made. It will be recalled that in explaining the block diagram in FIG. 6, it was mentioned that the conductors 138 are used to couple a signal from the range channel amplifier 136 into the phase-amplitude detector 130.

The specific circuitry employed for this purpose is appreciated most readily by tracing the conductors 138 upwardly, and to the left. Returning momentarily to FIG. 7a, and continuing to the left, the conductors 138 are seen to terminate in and feed the primary winding of the transformer 240. The transformer 240 and associated circuitry compare the phase of the vertical channel signal with that of the range channel signal, so that the cockpit indicator 132 receives a voltage which has a polarity determined by the direction of movement of the approaching drogue unit in the vertical plane. This, of course, means that the deflection of the cockpit indicator 132 corresponds to the signal sensitivity of the optical wedge in the vertical channel.

Returning again to the description of the rectifier unit 146, the diodes 364 and 366 used in the rectifier may comprise any suitable type of nonlinear barrier layer device, or semiconductor, such as a transistor diode or the like. A resistor 368 is connected between the tap junction on the secondary winding of transformer 362 and the common connection between the diodes 364 and 366. A smoothing capacitor 370 is connected in parallel with the resistor 368, and the conductors within the feedback line 148 are coupled to the opposite plates of the condensor. It will be obvious to those skilled in the art that the diodes 364 and 366 with the associated resistor 368 and capacitor 370 form a full wave rectifier and filter for deriving a unidirectional feedback voltage. This voltage is conveyed over feedback line 148 to the logarithmic gain control stage 142.

From the block diagram in FIG. 6, as well as from the detailed circuitry in FIGS. 7a 7b, it will be observed that a portion of the output signal developed by the range channel amplifier 136 is employed in energizing the range cockpit indicator stage 144. This signal is applied to a triode V9 by means of an extension of conductor 140.

The triode V9 comprises the input tube for the range cockpit indicator stage 144. The signal conveyed over the extension of conductor 140 is applied to the control grid of the triode tube V9, via grid leak resistor 372. The triode V9 which is used in the indicator 144 is connected to the B-minus bus 154 through a resistor 374. A series connected capacitor 376 and diode 378 are connected in shunt across the resistor 374. A D-Arsonval type Galvanometer 380 is connected through a diode 382 to the juncture between the resistor 376 and the diode 378. In practicing the invention, the use of a 200 microampere full scale deflection ammeter for this purpose yielded excellent results. The galvanometer 380 may be provided with a nonlinear scale similar to that described in connection with the meter 55 shown in FIG. 2. Immediately to the right of the galvanometer 380, a stabilizing condenser 384 is interconnected between the B-plus supply bus 176 and the B-minus bus 154.

In observing the details of the range cockpit indicator 144, it should be appreciated that the unidirectional voltage used to drive the galvanometer 380 is equally applicable to the modulation of the size or intensity of the luminous spot employed in a cathode ray oscilloscope-type cockpit indicator. The applicability of this type indicator for visually indicating horizontal and vertical position, as well as range, has been explained in detail earlier in this specification.

In concluding the detailed description of the range channel, reference will now be made to the bracketed portion of the circuitry identified in FIG. 7 by the numeral 142. This circuitry, of course, corresponds to the logarithmic gain control stage 142 shown in block diagram form in FIG. 6. As explained earlier in this patent specification, the need for an exponential response in the automatic gain control system poses a special problem. The gain control signal provided by the automatic gain control circuitry must be characterized by a magnitude which is exponentially related to the intensity of the radiant energy received by the range channel phototransistor stage. The logarithmic gain control stage 142 disclosed in the present invention provides such a signal.

In FIG. 7, the input triode V4 of the gain control stage 142 is illustrated in the approximate center of the drawing. The control grid potential of the tube is directly controlled by a special network, and the unidirectional feedback voltage conveyed over feedback line 148 is used to energize this network. More particularly, one of the conductors in the feedback line is connected through a pair of series connected resistors 386 and 388 to the B-minus bus 154. The opposite conductor is connected to the B-minus bus 154 through a pair of series connected resistors 390 and 392. The resistors 388 and 392 are provided with a pair of shunt capacitors 394 and 396, respectively, connected thereacross. A pair of series connected diodes 398 and 400 are connected to opposite ends of the resistors 388 and 392 to form a parallel branch therewith. The common juncture between the diodes 398 and 400 is connected directly to the control grid of the triode V4.

The ingenious feedback circuit connected to the grid of V4 finds its counterpart in the cathode circuit of the same tube. There, the unidirectional voltage conveyed over feedback line 148 is similarly utilized. One of the conductors in the line is connected through series connected resistors 402 and 404 to the B-minus bus 154. The opposite conductor is connected to the B-minus bus through series connected resistors 406 and 408. The resistors 404 and 408 are provided with a pair of shunt capacitors 410 and 412, respectively, connected thereacross. A pair of series connected diodes 414 and 416 are connected to opposite ends of the resistors 404 and 408 to form a parallel branch therewith. The common juncture between the diodes 414 and 416 is connected to the cathode of triode V4, via resistor 418 and capacitor 314. The automatic gain effected by the special grid and cathode networks just described provides an input to the range amplifier 136 which is proportional to the logarithm of the input signal applied to the amplifier, over a range of at least 60 decibels.

The logarithmic response of the gain control stage 142 is attributable to the nonlinear characteristics of the various diode elements used in conjunction with the circuitry. The logarithmic, or exponential variation between the forward voltage and current for the diodes indicated by reference numerals 398, 400, 414 and 416 is well-known to those skilled in the art. The same nonlinear relationship between forward voltage and current is characteristic of the diodes 364 and 366 illustrated in the rectifier unit 146 shown in FIG. 7b. The relationship between the forward voltage and the static impedance of the various diodes referred to immediately above is also logarithmic or exponential. As a result of this nonlinear relationship between voltage and current, the unidirectional feedback signal produced by rectifier unit 146 (FIG. 7b) and applied to the gain control stage 142 effects the required relationship between the output voltage developed by the range channel amplifier 136 and the input signal applied thereto. This output signal, of course, is proportional to the logarithm of the input signal applied to the amplifier by the gain control stage 142.

Proceeding now to the detailed description of the remainder of the invention, reference to the similarity between the vertical and horizontal channel circuitry may now be made. In general, the horizontal channel circuitry shown in the lowermost tier of blocks depicted in FIG. 6 comprises the mirror image of the vertical channel circuitry depicted thereabove. The obvious identity between the details of the vertical and horizontal channels is emphasized by circuitry illustrated in FIG. 7, FIG. 7a and FIG. 7b of the specification.

Except for the fact that the horizontal, rather than the vertical component of the incident radiant energy is polarized and detected by the optical wedge within the receiver unit, the details and method of operation of the horizontal channel substantially duplicate those of the vertical channel described in great detail immediately above. Turning momentarily to the block diagram representation in FIG. 6, it should be appreciated that the voltage developed by the range channel phototransistor stage 124 is utilized in the horizontal channel in exactly the same manner as in the vertical channel.

Thus, the conductor 172 applies the output of the stage 124 to a differential transformer 422 in the horizontal channel. If desired, the output of the differential transformer 422 may be passed through suitable conventional stages of filter circuitry, in the same manner as described in connection with the horizontal channel. The output of the transformer 422 is applied to the horizontal deflection gain control circuit 424 via a terminal "B." The relative positivity or negativity of terminal "B" is controlled by the regulating signal conveyed from the range channel amplifier 136, over conductor 140.

From the horizontal gain control circuit 424, the horizontal signal voltage is coupled into the horizontal channel amplifier stage 426. The amplified signal from stage 426 forms the input signal for a phase-amplitude detector 428. The detector 428 provides a unidirectional signal having a magnitude proportional to the relative lateral displacement of the approaching drogue unit. The detector 428 is also connected to receive a signal from the range channel amplifier 136 over phase-signal conductors 138. The phase of the signal delivered over conductors 138 is compared to that of the signal traversing the horizontal channel. Horizontal deflections by the drogue unit to the left or right of the optical axis of the receiver unit causes the detector 428 to produce voltage signals of correspondingly opposite polarity, respectively.

The output signal from phase amplitude detector 428 is applied to a horizontal cockpit indicator 430. The indicator 430 may include a zero-center D-Arsonval type galvanometer 534, as shown in FIG. 7b. In practicing the invention, a 200 microampere full scale deflection meter was found to operate very satisfactorily. It should be appreciated that the unidirectional voltage applied to cockpit indicator 430 may be applied equally well to the horizontal deflection plates of a conventional cathode ray oscilloscope. In such an oscilloscope, the vertical deflection plates are actuated by the output signal from the vertical channel, and the output of the range channel is used to modulate the size or intensity of the electron beam.

The unidirectional output voltage developed by the phase-amplitude detector 428 is also employed as an automatic gain control signal for the horizontal channel. The feedback line 432 reapplies this potential back to the condenser 446 within the phototransistor stage 420, as shown in FIG. 7. This causes the gain of the stage 420 to vary in accordance with changes in the received signal level, as explained in detail in connection with the explanation of the vertical channel.

In conclusion, it will now be evident that a novel method and means of producing a visual indication of the relative range and position between two moving airborne vehicles has been disclosed. However, it should be appreciated that the ingenious circuits and components described in this specification are by no means limited to the problem of establishing contact between aircraft for the purpose of aerial refueling. Although the application of the invention to flight refueling has been explained in detail herein, the system is equally applicable to other problems of mobile approach and closure, such as the establishment of contact between a satellite plane and a mother plane. It should also be appreciated that the invention is not limited to use with airborne vehicles. Thus, precision closure of ships at sea, or landborne vehicles may be effected equally well by practicing the invention.

The following tabular schedule provides the values of the various resistors and capacitors, and the types of semiconductor diodes, phototransistors and electron tubes used in practicing the invention. However, it is to be understood that the schedule is illustrative rather than limitative, and that other values and types of components may fall equally well within the purview of the claims to the invention.

HUNDRED OHM RESISTORS
332 334 336 340 350 358

THOUSAND OHM RESISTORS
274 304

THREE THOUSAND OHM RESISTORS
332 334 336

FIVE THOUSAND OHM RESISTORS
222 482

TEN THOUSAND OHM RESISTORS
160 208 210 230 251 256 258 260 272 374
388 392 404 408 447 452 454 492 518 524
526 528

TWENTY THOUSAND OHM RESISTORS
164 300 312 436

FIFTY THOUSAND OHM RESISTORS
156 200 204 247 250 386 390 400 402 406
442 462 512 514

HUNDRED THOUSAND OHM RESISTORS
186 218 242 244 320 322
324 368 464 480 508 510

HALF MEGOHM RESISTORS
372

ONE MEGOHM RESISTORS 152 178 220 308 310 316 326
328 330 418 449 474 488

ONE HUNDRED MICROFARAD CAPACITORS 226 306 314
337 348 354
356 360 486

ONE TENTH MICROFARAD CAPACITORS 188 486

ONE HALF MICROFARAD CAPACITORS 246 248 504 506

TEN MICROFARAD CAPACITORS 180 224 232 268 337
384 476 484 496 536

FORTY MICROFARAD CAPACITORS 166 170 206 208
249 276 302 394
396 410 412 440
446 456 458 516

T-I 620 DIODES 212 214 236 238 252 254
262 264 364 378 366 382
398 400 414 416 448 450
498 500 520 522 530 532

R-R 66 PHOTOTRANSISTORS 150 270 434

5904 TRIODE TUBES

V1 V3 V4 V8
V9 V10 V11 V12

5905 PENTODE TUBES

V2 V5 V6 V7

It will be apparent to those skilled in the art that many modifications of the disclosed embodiment of this invention may be made without departing from the scope thereof which is to be measured by the appended claims.

I claim:

1. In an intensity compensator circuit for deriving the relative range and coordinates of an approaching source of radiant energy, the combination comprising first and second radiant energy sensitive elements for producing voltages related to the rectangular coordinates of the source, a third radiant energy sensitive element for producing a voltage related to the range of the source, a group of three resistors connected in series between ground and said third element, three space discharge devices provided each with operating potential from a B-plus supply, a first pair of resistors interconnected between the control grid electrodes of a pair of said space discharge devices and said first and second sensitive elements respectively, a second pair of resistors interconnected between said control grid electrodes and the common junction between a pair of said group of three series connected resistors, a third pair of resistors interconnected between the cathode electrodes of said pair of space discharge devices and the common junction between a different pair of said group of three series connected resistors, conductor means coupling the control grid electrodes of the remaining space discharge device to said third sensitive element, and means including conductor means for making available the output signals produced by said three space discharge devices in the form of separate amplified voltages proportional to the range and rectangular coordinates of the approaching source of radiant energy.

2. In an intensity compensator circuit for deriving the relative range and coordinates of an approaching source of radiant energy, the combination comprising first and second radiant energy sensitive elements for producing voltages related to the rectangular coordinates of the source, a third radiant energy sensitive element for producing a voltage related to the range of the source, a group of three resistors connected in series between ground and said third element, three separate amplifier means connected to receive operating potential from a B-plus supply, conductor means coupling the control electrode of one of said amplifier means to the point on said resistor means most electrically remote from ground, a first pair of resistors interconnected between the control electrodes of the remaining pair of said amplifier means and said first and second sensitive elements, another pair of resistors interconnected between the cathode electrodes of said amplifier means and the point on said resistor means least electrically remote from ground, still another pair of resistors interconnected between said control electrodes and a point on said resistance means between said previously recited electrically remote points, and means including conductor means for making available output signals produced by said amplifier means in the form of amplified separate voltages proportional to the range and rectangular coordinates of the approaching source of radiant energy.

3. In an intensity compensator circuit for deriving the relative range and rectangular coordinates of an approaching source of radiant energy, the combination comprising first and second radiant energy sensitive elements for producing voltages related to the rectangular coordinates of the source, a third radiant energy sensitive element for producing a voltage related to the range of the source, a group of three resistors connected in series between ground and said third element, at least two pentode tubes and a triode tube connected to receive operating potential from a B-plus supply, a first pair of resistors interconnected between the control grid electrodes of said pentode tubes and said first and second sensitive elements respectively, a second pair of resistors interconnected between said control grid electrodes and the common junction between a pair of said group of three series connected resistors, conductor means coupling the control grid of said triode tube to said third sensitive element, and means including conductor means for making available the output signals produced by said triode and said pentodes in the form of separate amplified voltages proportional to the range and rectangular coordinates of an approaching source of radiant energy.

4. In a plural channel intensity compensator circuit for developing a visual indication of the range and coordinates of an approaching source of radiant energy, vertical and horizontal channel phototransistor stages provided each with a radiation sensitive semiconductor device therein, a pair of differential transformers connected each to receive an input signal from said vertical and horizontal phototransistor stages respectively, a range channel phototransistor stage provided with a radiation sensitive semiconductor device therein and connected to supply signals to each of said differential transformers, a range channel amplifier connected to develop a phase-signal as well as a regulating potential for signal magnitude control within the channels of said intensity compensator circuit, a logarithmic gain control stage conductively coupled between said range channel phototransistor stage and said range channel amplifier and connected to receive a unidirectional feedback voltage related to the regulating potential developed by said range amplifier, vertical and horizontal deflection gain control circuits connected to receive the output voltages produced by said respective differential transformers and adjust the apparent magnitudes thereof responsive to changes in the value of said regulating potential developed by said range channel amplifier, vertical and horizontal channel amplifier stages connected to receive input signals from said respective vertical and horizontal gain control circuits, a pair of phase-amplitude detectors connected to receive input signals from said last-mentioned amplifier stages and phase-signals from said range channel amplifier and develop separate unidirectional voltages of reversible polarity responsive thereto, means including conductor means for reapplying portions of said separate unidirectional voltages back to said vertical and horizontal phototransistor stages as feedback signals therefor, and means connected to visually display the magnitude and polarity of said unidirectional voltages and provide a visual signal related to the magnitude of said regulating potential developed by said range channel in rectified form.

5. In a plural channel intensity compensator circuit for developing a visual indication of the relative range and rectangular coordinates of a moving radiation source which emits discrete pulses of energy at a predetermined frequency; vertical and horizontal channel phototransistor stages provided each with a radiation-sensitive semiconductor device therein, said phototransistor stages each further provided with a parallel connected inductor and capacitance capable of resonating at said predetermined frequency; a pair of differential transformers connected each to receive an input signal from said vertical and horizontal phototransistor stages respectively; a range channel phototransistor stage provided with a radiation-sensitive semiconductor device therein and connected to supply signals to each of said differential transformers, said range channel phototransistor stage further provided with a parallel connected inductor and capacitance capable of resonating at said predetermined frequency; a range channel amplifier connected to develop a phase-signal as well as a regulating potential for signal magnitude control within the channels of said intensity compensator circuit, a logarithmic gain control stage conductively coupled between said range channel phototransistor stage and said range channel amplifier and connected to receive a unidirectional feedback voltage related to the regulating potential developed by said range channel amplifier, vertical and horizontal gain control circuits connected to receive the output voltages produced by said respective differential transformers and adjust the apparent magnitude thereof responsive to changes in the value of said regulating potential developed by said range channel amplifier, vertical and horizontal channel amplifier stages connected to receive the input signals from said respective vertical and horizontal gain control circuits, a pair of phase amplitude detectors connected to receive input signals from said last-mentioned amplifier stages and phase-signals from said range amplifier and develop separate unidirectional voltages of reversible polarity responsive thereto, means including conductor means for reapplying said separate respective voltages back to said vertical and horizontal phototransistor stages as feedback signals therefor, and means connected to visually display the magnitude and polarity of said unidirectional voltages and provide a visual signal related to the magnitude of said regulating potential developed by said range channel amplifier in rectified form.

6. In a receiver for polarizing the incident energy received from a moving source of radiation into components proportional to the range and rectangular coordinates of said source, a lens and filter system mounted to filter and collimate said energy received from said source, a first beam splitter positioned to both reflect and transmit predetermined portions of said collimated beam, a first optical wedge mounted to intercept the component of said beam reflected by said first beam splitter, a first radiation-sensitive element positioned to sample the fraction of said beam which penetrates said first optical wedge and produce a first voltage related thereto, a second beam splitter positioned to both reflect and transmit predetermined fractions of the beam portion permitted to penetrate said first beam splitter, a second optical wedge mounted to intercept the beam portion reflected by said second beam splitter, a second radiation-sensitive element positioned to sample the energy which traverses said second optical wedge and develop a second voltage responsive thereto, and a third radiation-sensitive element mounted to intercept the portion of said beam allowed to penetrate said second beam splitter and develop a third voltage proportional to the intensity thereof.

7. In a receiver for polarizing the incident energy received from a moving source of radiation into components proportional to the range and rectangular coordinates of said source, means mounted to filter and collimate said energy received from said source, at least two beam splitter means positioned to reflect and transmit preset fractions of said received radiant energy, a pair of optical wedge means mounted each to intercept a beam portion reflected by one of said splitter means, a pair of radiation-sensitive elements mounted each to receive energy propagated through one of said wedge means and produce a voltage related to the intensity thereof, and a third radiation-sensitive element mounted to intercept the preset fraction of said radiant energy transmitted by one of said beam splitter means and develop a voltage proportional to the intensity thereof.

8. In a receiver for polarizing the incident energy received from a moving source of radiation into components proportional to the range and rectangular coordinates of said source, first means mounted within said receiver to permit reflection as well as transmission of specific fractions of said energy, second means mounted within said receiver to permit reflection as well as transmission of specific portions of the fraction of said energy which penetrates said first means, third and fourth means disposed to intercept the reflected energy propagated by said first and second means respectively and transmit portions of said energy controlled by the point at which said last-mentioned means intercept said energy, at least two radiation-sensitive means mounted to sample energy penetrating said respective third and fourth means and develop separate electric potentials responsive thereto, and radiation-sensitive means mounted to intercept said specific portion transmitted by said second means and develop an electric potential responsive thereto.

9. In a receiver for polarizing the incident energy received from a moving source of radiation into components proportional to the range and rectangular coordinates of said source, a lens and filter system mounted to filter and collimate said energy received from said source, a first beam splitter positioned to both reflect and transmit predetermined portions of said collimated beam, a first plano-cylindrical lens mounted to intercept the component of said beam reflected by said first beam splitter, a first optical wedge disposed to receive energy propagated through said first plano-cylindrical lens, a second plano-cylindrical lens mounted to intercept energy transmitted through said first wedge, a first radiation-sensitive element positioned to sample the energy penetrating said last-mentioned lens and develop a first voltage related thereto; a second beam splitter mounted to both reflect and transmit preset fractions of the beam portion allowed to penetrate said first beam splitter, a third plano-cylindrical lens mounted to intercept the component of said beam portion reflected by said second beam splitter, a second optical wedge disposed to receive energy propagated through said third lens, a fourth plano-cylindrical lens mounted to intercept energy transmitted through said second wedge, a second radiation-sensitive element positioned to sample the energy penetrating said last-mentioned lens and develop a second voltage responsive thereto, and a third radiation-sensitive element mounted to intercept the portion of the said beam allowed to penetrate said second beam splitter and develop a third voltage responsive to the intensity thereof.

10. In a receiver for polarizing the incident energy received from a moving source of radiation into components proportional to the range and rectangular coordinates of said source, first means mounted within said receiver to permit reflection as well as transmission of specific fractions of said energy, second means mounted within said receiver to permit reflection as well as transmission of specific proportions of the fraction of said energy which penetrates said first means, third and fourth means disposed to intercept the reflected energy propagated by said first and second means respectively and transmit portions of said energy controlled by the point at which said last-mentioned means intercept said energy, first and second semi-cylindrical lens means mounted respectively to collimate and shape the energy incident upon said third and fourth means, at least two radiation-sensitive means mounted to sample energy penetrating said respective third and fourth means and develop separate electric potentials responsive thereto, third and fourth semi-cylindrical lens means mounted respectively to collimate the energy incident upon said radiation-sensitive means, spherical lens means mounted to intercept said specific energy portion transmitted by said second means, and radiation-sensitive means mounted to intercept said specific energy portion traversing said spherical lens means and develop an electric potential responsive thereto.

11. In a receiver for polarizing the incident energy received from a moving source of radiation into components proportional to the range and rectangular coordinates of said source, means mounted to filter and collimate said energy received from said source, at least two beam splitter means positioned to reflect and transmit definite fractions of said received energy, a pair of optical wedge means mounted to intercept the beam portions reflected by said respective splitter means, first lens means mounted to intercept the beam portion between one of said wedge means and one of said splitter means, second lens means mounted to intercept the beam portion between the other of said wedge means and the other of said splitter means, a pair of radiation-sensitive elements mounted to receive energy propagated through said respective wedge means and produce voltages related thereto, third lens means positioned between one of said wedge means and one of said radiation-sensitive means to further shape and collimate the energy transmitted therebetween, fourth lens means positioned between the other of said wedge means and the other of said sensitive means, a spherical lens mounted to intercept the fraction of said energy transmitted through one of said beam splitter means, and a radiation-sensitive element mounted to intercept the energy which traverses said spherical lens and develop a voltage proportional to the intensity thereof.

12. In an apparatus for developing potential related to the relative range and coordinates of an approaching source of radiant energy, the combination comprising means for intercepting a portion of the radiant energy which emanates from the source, means adapted for splitting part of the intercepted portion of the energy into mutually perpendicular components related to the horizontal and vertical deviations of the source from a predetermined datum, radiation-sensitive means responsive to the mutually perpendicular components of the energy for generating electromotive forces related to the intensity thereof, and a second radiation-sensitive device responsive to the remaining part of the intercepted portion of the energy for developing an additional potential related to the relative intensity thereof.

13. In an apparatus for producing within a cockpit of an airplane a visual indication of the position of a component of a second aircraft, the combination comprising means for receiving a beam of radiant energy from within the component, means for polarizing the beam of energy into three separate energy fractions related to the rectangular coordinates and range of the component, means responsive to the intensities of the three separate energy fractions respectively for developing three separate electric potentials proportional thereto, means for amplifying the pair of electric potentials related to the rectangular components of the component, means for amplifying the electrical potential related to the range of the component, means for modifying the degree of amplification imparted to the pair of electric potentials in accordance with variations in the signal magnitude of the electric potential related to the range of the component, and an indicating device responsive to the three amplified electric potentials for producing visual indication of the position of the component.

14. In an intensity compensator apparatus for deriving the relative range and coordinates of an approaching source of radiant energy with relation to a receiver of said radiant energy, the combination comprising first means operatively connected to said receiver for deriving a first electrical signal proportional to the intensity of radiant energy received from said source and direction from said receiver to said source, second means deriving a second electrical signal proportional to the intensity of the radiant energy received from said source, and means responsive to said first and second signals for amplifying said first signal to derive an electrical signal proportional only to the direction from said receiver to the source.

15. In an apparatus for deriving the relative range and coordinates of an approaching source of radiant energy with relation to a receiver of said radiant energy, the combination comprising first means operatively connected to said receiver for deriving a first electrical signal proportional to the intensity of radiant energy received from said source and direction from said receiver to said source, means for deriving a second electrical signal proportional to the intensity of the radiant energy received from said source, a space discharge device operatively connected to said first means and adapted to amplify the first signal as an exponential function thereof, and means operatively connected to said space discharge device for varying exponentially the gain thereof in response to variations in the second electrical signal whereby the signal derived from said amplifying means is insensitive to the intensity of the radiant energy received from said source.

16. In an intensity compensator apparatus for deriving the relative range and coordinates of an approaching source of radiant energy with relation to a receiver of said radiant energy, the combination comprising means operatively connected to said receiver for deriving a first electrical signal proportional to the intensity of radiant energy received from said source and direction from said receiver to said source, means for deriving a second electrical signal proportional to the intensity of the radiant energy received from said source, a space discharge device operatively connected to said first means and adapted to amplify the first signal as an exponential function thereof, and a voltage divider network operatively connected to the control electrodes of said space discharge device for varying the bias thereon in accordance with variations in the second electrical signal.

17. In an intensity compensator apparatus for deriving the relative range and coordinates of an approaching source of radiant energy with relation to a receiver of said radiant energy having a reference axis, the combination comprising first means operatively connected to said receiver for deriving an electrical signal proportional to the intensity of the radiant energy received from said source and the horizontal displacement of said source from said reference axis, second means operatively connected to said receiver for deriving an electrical signal proportional to the intensity of radiant energy received from said source and the vertical displacement of said source from said reference axis, third means operatively connected to said receiver for deriving an electrical signal proportional to only the intensity of the radiant energy received from said source, means responsive to the signal derived by said first means and the signal derived by said third means for amplifying the signal derived by said first means to provide an electrical signal proportional only to horizontal displacement of said source from said reference axis, and means responsive to the signal derived by said second means and the signal derived by said third means for amplifying the signal derived by said second means to provide an electrical signal proportional only to the vertical displacement of said source from said reference axis.

References Cited in the file of this patent

UNITED STATES PATENTS

| | | |
|---|---|---|
| 2,167,484 | Berry | July 25, 1939 |
| 2,335,180 | Goldsmith | Nov. 23, 1943 |
| 2,415,190 | Rajchman | Feb. 4, 1947 |
| 2,415,191 | Rajchman | Feb. 4, 1947 |
| 2,418,137 | Noel | Apr. 1, 1947 |
| 2,565,213 | Falkenstein | Aug. 21, 1951 |
| 2,601,327 | Rose | June 24, 1952 |
| 2,651,771 | Palmer | Sept. 8, 1953 |
| 2,700,318 | Snyder | Jan. 25, 1955 |
| 2,797,256 | Millspaugh | June 25, 1957 |
| 2,824,488 | Bridges et al. | Feb. 25, 1958 |
| 2,882,783 | Blackstone | Apr. 21, 1959 |